(12) United States Patent
Ohhama et al.

(10) Patent No.: US 9,944,332 B2
(45) Date of Patent: Apr. 17, 2018

(54) JOINING METHOD FOR FORMING A JOINT STRUCTURE OF DIFFERENT MATERIALS USING A PERIPHERAL GROOVE

(71) Applicant: HONDA MOTOR CO., LTD., Minato-ku, Tokyo (JP)

(72) Inventors: Shosuke Ohhama, Saitama (JP); Tetsuya Miyahara, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/744,193

(22) Filed: Jun. 19, 2015

(65) Prior Publication Data
US 2015/0336205 A1    Nov. 26, 2015

Related U.S. Application Data

(63) Continuation of application No. 13/991,500, filed as application No. PCT/JP2011/078214 on Dec. 6, 2011, now Pat. No. 9,067,621.

(30) Foreign Application Priority Data

Dec. 6, 2010 (JP) ................................. 2010-271337
Dec. 6, 2010 (JP) ................................. 2010-271339
(Continued)

(51) Int. Cl.
B23K 20/12    (2006.01)
B62D 27/02    (2006.01)
(Continued)

(52) U.S. Cl.
CPC .......... *B62D 27/026* (2013.01); *B23K 20/122* (2013.01); *B23K 20/125* (2013.01);
(Continued)

(58) Field of Classification Search
CPC .......................... B23K 20/122; B23K 20/125; B23K 20/1265; B62D 21/00; B62D 21/11;
(Continued)

(56) References Cited

U.S. PATENT DOCUMENTS 5,660,668 A * 8/1997 Matheson .............. B23K 26/08
156/268
5,917,685 A * 6/1999 Kikuchi ............. G11B 23/0308
360/133
(Continued)

FOREIGN PATENT DOCUMENTS

DE        102 26 526 A1    8/2003
DE   10 2009 030 432 A1    1/2011
(Continued)

OTHER PUBLICATIONS

Examination Report dated Mar. 23, 2017 issued over the corresponding German Patent Application 11 2011 104 032.6 with the English translation thereof.
(Continued)

*Primary Examiner* — Erin B Saad
*Assistant Examiner* — Carlos J Gamino
(74) *Attorney, Agent, or Firm* — William D. Blackman; Joseph P. Carrier

(57) ABSTRACT

A joining method for forming a joint structure of different materials includes steps of: providing a steel member and a light metal member stacked on each other and to be joined together by friction stir welding in a non-melted state; applying a coating to the steel member; and joining the steel member and the light metal member together by rotatingly pushing a rotation tool into a joint portion of the light metal member with the steel member, generating friction heat and having the joint portion of the light metal member softened and plastically flow under the friction heat.

9 Claims, 24 Drawing Sheets

(30) Foreign Application Priority Data

Dec. 6, 2010 (JP) ................................. 2010-271340
Jan. 21, 2011 (JP) ................................. 2011-010831

(51) Int. Cl.
| | |
|---|---|
| *B62D 21/15* | (2006.01) |
| *B62D 29/00* | (2006.01) |
| *C25D 7/00* | (2006.01) |
| *B62D 21/11* | (2006.01) |
| *B62D 21/00* | (2006.01) |

(52) U.S. Cl.
CPC .......... *B23K 20/1265* (2013.01); *B62D 21/00* (2013.01); *B62D 21/11* (2013.01); *B62D 21/155* (2013.01); *B62D 27/02* (2013.01); *B62D 27/023* (2013.01); *B62D 29/00* (2013.01); *B62D 29/008* (2013.01); *C25D 7/00* (2013.01)

(58) Field of Classification Search
CPC .... B62D 21/155; B62D 27/02; B62D 27/023; B62D 27/026; B62D 29/00; B62D 29/008; C25D 7/00
USPC ....................................................... 156/295
See application file for complete search history.

(56) References Cited

U.S. PATENT DOCUMENTS

| | | | | | |
|---|---|---|---|---|---|
| 5,947,073 | A * | 9/1999 | Chaffin | ............ | F02M 35/10321 123/184.61 |
| 6,265,079 | B1 * | 7/2001 | Nishiguchi | ............ | C09D 5/086 204/499 |
| 6,294,043 | B1 * | 9/2001 | Greig | ................. | B62D 27/026 156/290 |
| 6,321,975 | B1 * | 11/2001 | Kawasaki | ............ | B23K 20/122 228/112.1 |
| 6,509,099 | B1 * | 1/2003 | Urata | ....................... | B05D 7/14 428/423.1 |
| 6,536,879 | B2 * | 3/2003 | Ito | ........................ | B41J 2/14209 347/71 |
| 7,353,977 | B2 * | 4/2008 | Nishiguchi | .......... | B23K 20/123 228/112.1 |
| 7,360,875 | B2 * | 4/2008 | Terakura | ............... | B41J 2/14209 347/71 |
| 7,997,472 | B2 * | 8/2011 | Szymanski | .......... | B23K 20/122 228/112.1 |
| 2001/0038028 | A1 * | 11/2001 | Iwashita | ............ | B23K 20/123 228/112.1 |
| 2004/0041006 | A1 * | 3/2004 | Masingale | ......... | B23K 20/1265 228/112.1 |
| 2005/0005552 | A1 * | 1/2005 | Shuttleworth | .......... | B29C 66/54 52/459 |
| 2005/0087582 | A1 * | 4/2005 | Van Aken | ............ | B23K 20/122 228/112.1 |
| 2005/0120535 | A1 * | 6/2005 | Gendou | ............... | B23K 20/123 29/428 |
| 2006/0138197 | A1 * | 6/2006 | Aota | .................. | B23K 20/1255 228/112.1 |
| 2007/0017960 | A1 * | 1/2007 | Talwar | ................. | B23K 20/122 228/112.1 |
| 2010/0053908 | A1 * | 3/2010 | Hwang | .................. | H05K 1/142 361/741 |
| 2010/0065611 | A1 * | 3/2010 | Fukuda | ............. | B23K 20/1265 228/56.3 |
| 2011/0308724 | A1 * | 12/2011 | Ait-Mani | ................... | C09J 5/00 156/295 |
| 2013/0280492 | A1 * | 10/2013 | Rossi | ................ | H01L 27/14618 428/167 |
| 2014/0246882 | A1 * | 9/2014 | Miyahara | ............... | B62D 21/00 296/203.01 |
| 2014/0248510 | A1 * | 9/2014 | Sayama | ................ | B32B 15/012 428/653 |
| 2015/0085169 | A1 * | 3/2015 | Igarashi | ................ | H01L 25/042 348/294 |
| 2015/0175207 | A1 * | 6/2015 | Hata | .................... | B23K 20/122 280/785 |

FOREIGN PATENT DOCUMENTS

| | | | |
|---|---|---|---|
| JP | 04139883 | A * | 5/1992 |
| JP | 2004158814 | A * | 6/2004 |
| JP | 2009126472 | A * | 6/2009 |

OTHER PUBLICATIONS

Office Action issued in co-pending U.S. Appl. No. 14/745,822 dated Sep. 26, 2017.

* cited by examiner

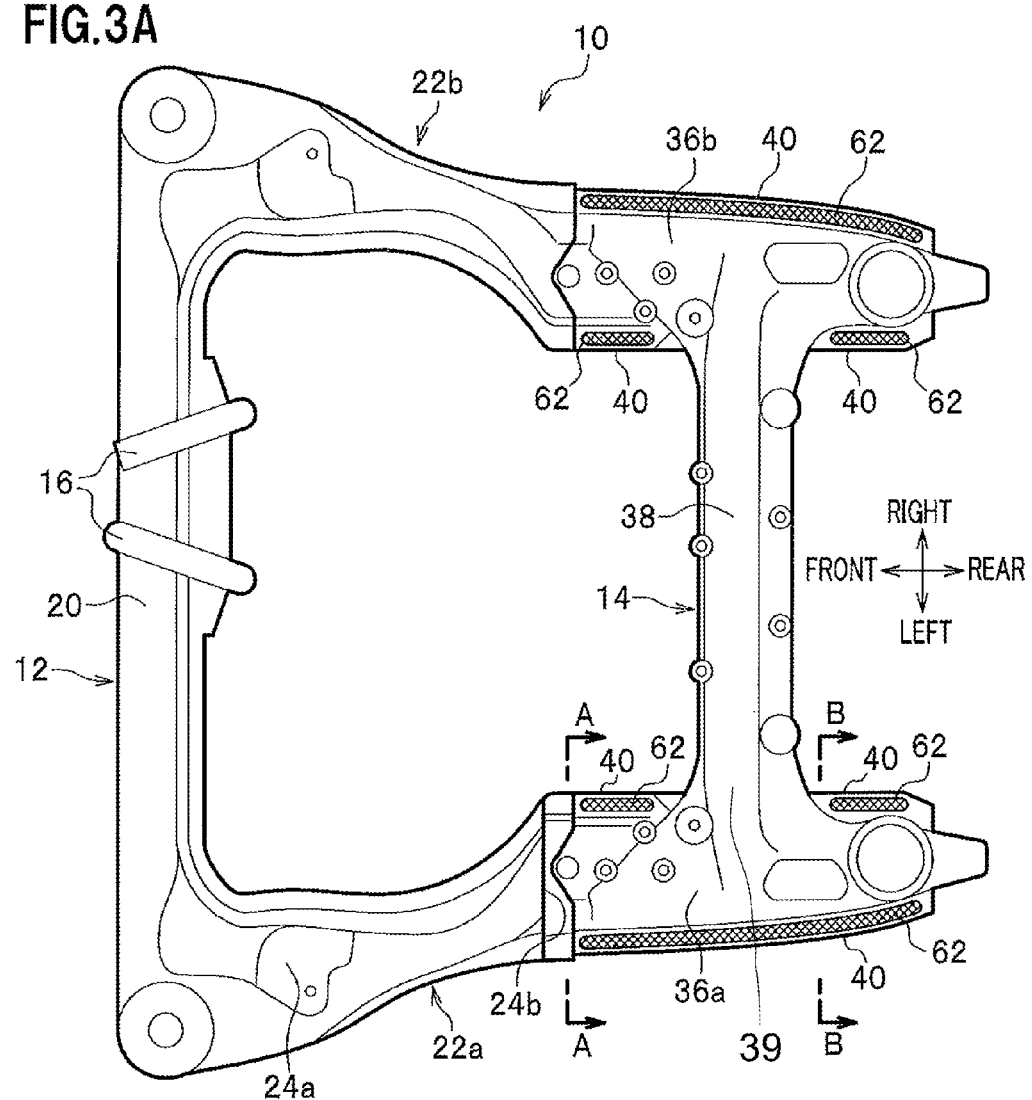
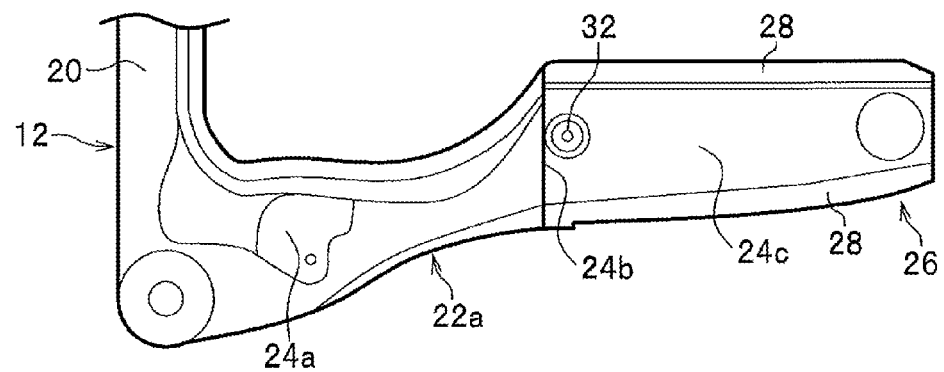

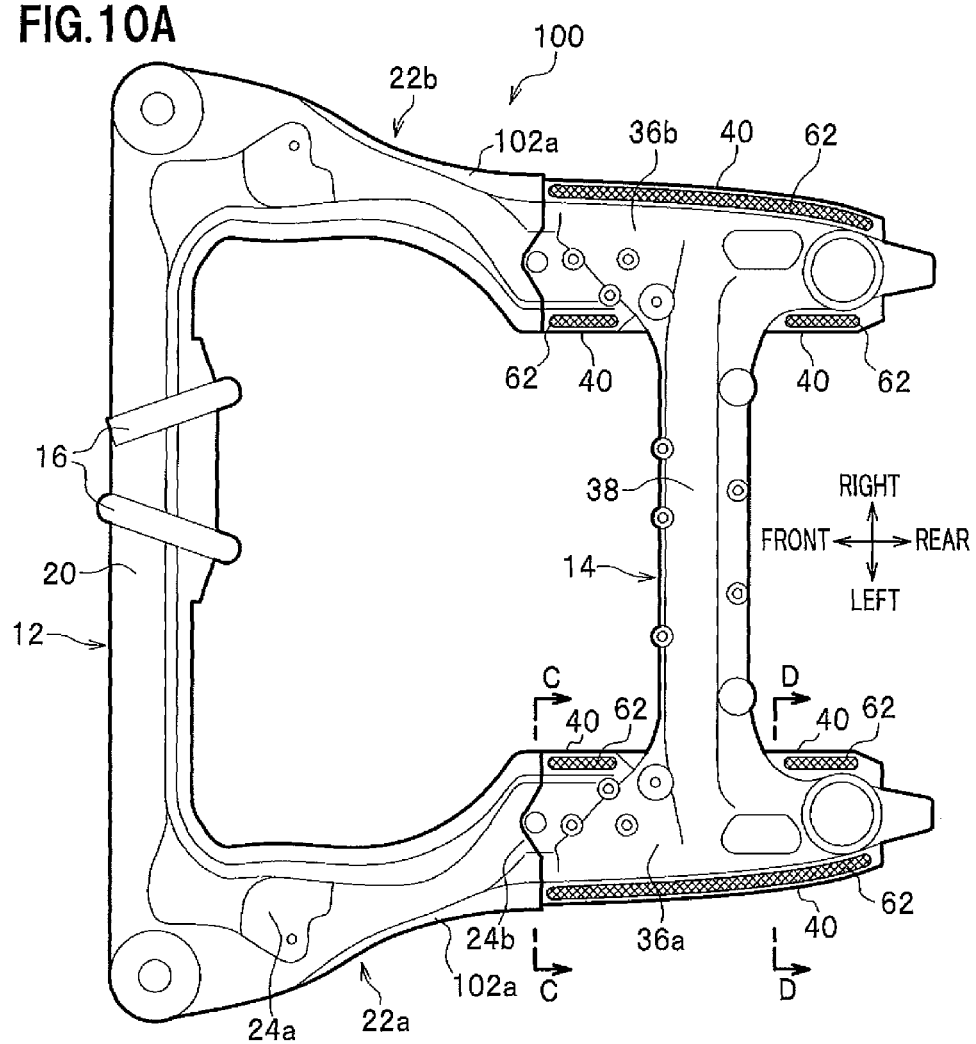
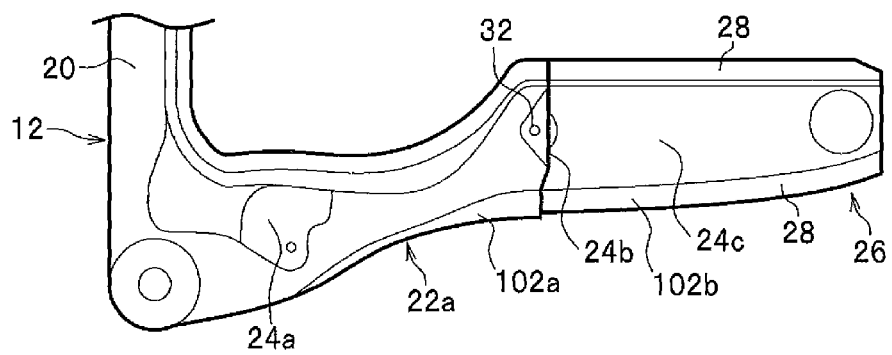

JOINING METHOD FOR FORMING A JOINT STRUCTURE OF DIFFERENT MATERIALS USING A PERIPHERAL GROOVE

CROSS REFERENCE TO RELATED APPLICATIONS

The present application is a continuation application of U.S. Ser. No. 13/991,500, filed 4 Jun. 2013, which is the US National Phase Application of International Application PCT/JP2011/078214, filed on 6 Dec. 2011, which claims priority to Japanese patent applications Nos. 2010-271337, 2010-271339, and 2010-271340, all filed on 6 Dec. 2010, and 2011-010831, filed on 21 Jan. 2011. The entire subject matter of these priority documents, including specification claims and drawings thereof, is incorporated by reference herein.

TECHNICAL FIELD

The present invention relates to a subframe structure mounted in the front of a vehicle such as an automobile, and to a joining method for forming a joint structure of differential materials.

BACKGROUND ART

Vehicles such as automobiles use a subframe structure fixed to a front side frame serving as a vehicle-body member, installed with a suspension component such as, e.g., a suspension arm and a stabilizer, and used for supporting the suspension component.

As a subframe structure of this type, Patent Literature 1, e.g., discloses one including a rear member made of light metal and installed with a suspension component; two side members made of steel, joined to the front ends of the two lateral sections of the rear member, and extending toward the front of a vehicle; and a cross member connecting the two side members to each other in the width direction of the vehicle.

In addition, Patent Literature 2 discloses a vehicle subframe in which a grid-shaped die-cast subframe is configured to be divided into two and the freedom degree of the shape of the dividing and joining portion can be enhanced.

Further, Patent Literature 3 relates to the joining mechanism of an automobile structure in connection with a center pillar and discloses the friction stir welding of a flange at an end edge on the side of the opening of a box-shaped structural member made of an aluminum alloy and a flat-plate-shaped cover made of a zinc steel plate.

Furthermore, Patent Literature 4 discloses a method for joining different types of metals together in which both materials made of the different types of metals are superposed one on the other via a sealant, the deformation resistance of the sealant is reduced by heating to discharge the sealant interposed at the joining section from the joining interface, and both the materials are joined together by resistance welding or laser beam irradiation in a state in which both the materials are brought into direct contact with each other. Furthermore, Patent Literature 5 describes a method for joining different types of metals together by friction welding.

PRIOR ART REFERENCE

Patent Literature

Patent Literature 1: JP 2007-302147 A
Patent Literature 2: JP 2006-347464 A
Patent Literature 3: JP 2009-126472 A
Patent Literature 4: JP 2008-23583 A
Patent Literature 5: JP 4134837 B2

SUMMARY OF THE INVENTION

Problems to be Solved by the Invention

Meanwhile, for its installation of a suspension component, a subframe structure disposed in the front of a vehicle is required to ensure desired rigidity at the installation section. In addition, since the subframe structure is disposed in the front of the vehicle, it is required to absorb an impact at the collision of the vehicle to prevent the impact from being transmitted into a passenger room. Moreover, it is required to achieve the weight reduction of the entire vehicle from the viewpoint of energy saving or the like.

Further, for example, it is assumed that the members made of the different types of metals disclosed in Patent Literature 1 are integrally joined together by the application of the joining method disclosed in Patent Literature 3. That is, it is assumed that flanges are provided at the end surfaces of the lateral sections of the rear member made of light metal and at the end surfaces of the side member made of steel, respectively, and the flange on the side of the rear member and the flange on the side of the side member are joined together by the friction stir welding to construct the subframe structure. However, the subframe structure obtained by applying the joining method of Patent Literature 3 to the structure of Patent Literature 1 gives rise to the problem that a closed cross section at the joining portion cannot be increased and desired rigidity and strength for supporting the suspension component are hardly ensured.

Further, joining of the members made of the different types of metals together by the application of the joining method of Patent Literature 3 to the structure of Patent Literature 1 gives rise to the problem that the temperature of a portion subjected to the friction stir welding is increased and an electrodeposition coating film coated by electrodeposition coating on the rear surface of the portion subjected to the friction stir welding (the surface on a side opposite to the joining surface between the different types of metals) is separated.

Furthermore, in a case in which the front subframe and the rear subframe of the subframe structure are joined together by melt welding without having coatings applied thereto but they have the coatings applied thereto afterwards, their structure becomes complicated, resulting in a difficulty in electrodeposition coating at their joining interfaces.

A general object of the present invention is to provide a subframe structure capable of ensuring desired rigidity and strength, enhancing shock absorption performance, and achieving a weight reduction.

A main object of the present invention is to provide the subframe structure capable of increasing closed cross sections at joining portions and ensuring desired rigidity and strength.

Another object of the present invention is to provide the subframe structure capable of preventing the separation of electrodeposition coating films at the rear surfaces of the joining portions even if the different types of metals are joined together by friction stir welding.

Another object of the present invention is to provide the subframe structure capable of applying coatings to joining interfaces.

Means for Solving the Problem

In order to achieve the above objects, the present invention is characterized in that in a subframe structure for a vehicle, the subframe structure being arranged at a front of the vehicle and fixed to or floatably supported by a vehicle-body member, including: a front subframe made of steel; and a rear subframe made of light metal, wherein the rear subframe and the front subframe are divided in a front-rear direction of the vehicle, and the front subframe and the rear subframe are joined together by friction stir welding in a state in which the rear subframe is superposed on the front subframe.

According to the present invention, the front subframe is made of steel, the rear subframe is made of light metal, and both the front subframe and the rear subframe are joined together by the friction stir welding. Thus, desired rigidity and strength for the installation or the like of a suspension component such as a suspension arm can be ensured, and shock absorption performance at collision can be enhanced.

In addition, according to the present invention, the rear subframe includes an aluminum die-cast body made of an aluminum alloy or the like. Therefore, the weight reduction of the entire subframe structure can be achieved. Moreover, according to the present invention, the rear member conventionally including the two members of an upper member and a lower member is integrated, and various reinforcing components conventionally provided inside the hollow rear member are integrally formed by die-casting. Thus, with a reduction in the number of components, the weight reduction can be further achieved.

Further, according to the present invention, the left and right rear side sections of the rear subframe made of light metal such as, e.g., an aluminum alloy are superposed on the upper surfaces of extending sections formed in the front subframe made of steel to join flange sections together. Thus, the desired rigidity and strength for the installation of a suspension component such as a suspension arm can be ensured, and shock absorption performance at collision can be enhanced.

Furthermore, according to the present invention, the rear subframe including the pair of left and right rear side sections and a rear cross section is made of a light metal material such as, e.g., an aluminum alloy. Thus, the weight reduction can be further achieved than before.

Furthermore, according to the present invention, bolts penetrating closed cross sections are fastened at non-joining portions at which the front subframe and the rear subframe are not joined together, and the non-joining sections at which welding is not allowed can be reinforced by the fastening of the bolts. The front subframe and the rear subframe are firmly fixed together by the joining of the respective flange sections at their superposed portions, while the front subframe and the rear subframe are fastened together by the bolts at the non-welding portions not joined together. Thus, the rigidity and strength of the entire subframe structure can be further increased. As a result, even in a case in which the different types of the metals of the front subframe made of steel and the rear subframe made of light metal are mutually joined together, the closed cross sections at the joining portions can be increased and the desired rigidity and strength can be ensured in cooperation with the bolt fastening portions serving as the non-joining portions.

Furthermore, according to the present invention, the transfer of friction heat generated by the friction stir welding to electrodeposition coating films formed on the lower surfaces of thin plates on the lower layer side is avoided, and the temperature of the rear surfaces of the portions of the electrodeposition coating films formed on the lower surfaces of the thin plates on the lower layer side is reduced. Thus, the separation of the electrodeposition coating films formed on the rear surfaces of the friction stir welding portions is prevented so that the electrodeposition coating films can be protected.

Furthermore, according to the present invention, the left and right side members of the front subframe have the two or more steel thin plates joined together, and the closed cross sections are formed between the joined steel thin plates. Thus, the rigidity and strength can be further increased.

Effect of the Invention

The present invention can provide a subframe structure capable of ensuring desired rigidity and strength, enhancing shock absorption performance, and achieving a weight reduction.

In addition, the present invention can provide the subframe structure capable of increasing closed cross sections at joining portions and ensuring desired rigidity and strength.

Further, the present invention can provide the subframe structure capable of preventing the separation of electrodeposition coating films at the rear surfaces of the joining portions even if the different types of metals are joined together by friction stir welding.

Furthermore, the present invention can provide the subframe structure capable of applying coatings to joining interfaces.

BRIEF DESCRIPTION OF THE DRAWINGS

FIG. 3A is a plan view of the subframe structure according to the first embodiment;

FIG. 3B is a partial plan view of a front subframe in a state in which a rear subframe is removed from the subframe structure;

FIG. 10A is a plan view of the subframe structure according to the second embodiment;

FIG. 10B is a partial plan view of the front subframe in a state in which the rear subframe is removed from the subframe structure;

FIGS. 21A-21C are views showing the process of joining the front subframe and the rear subframe together by the friction stir welding in the first embodiment, in which FIG. 21A is a view showing the process of setting a workpiece; FIG. 21B is a view showing the process of applying the sealant; and FIG. 21C is a view showing the process of superposing the workpieces one on the other;

FIGS. 27A-27C are views showing the process of the friction stir welding applied to the subframe structure according to the fifth embodiment, in which FIG. 27A is a cross-sectional view showing the state of the start section of a location at which the friction stir welding is started; FIG. 27B is a cross-sectional view showing a state before the friction stir welding at the end section of a location at which the friction stir welding is ended; and FIG. 27C is a cross-sectional view showing a state after the friction stir welding at the end section of a location at which the friction stir welding is ended.

EMBODIMENTS FOR CARRYING OUT THE INVENTION

Figure 1:
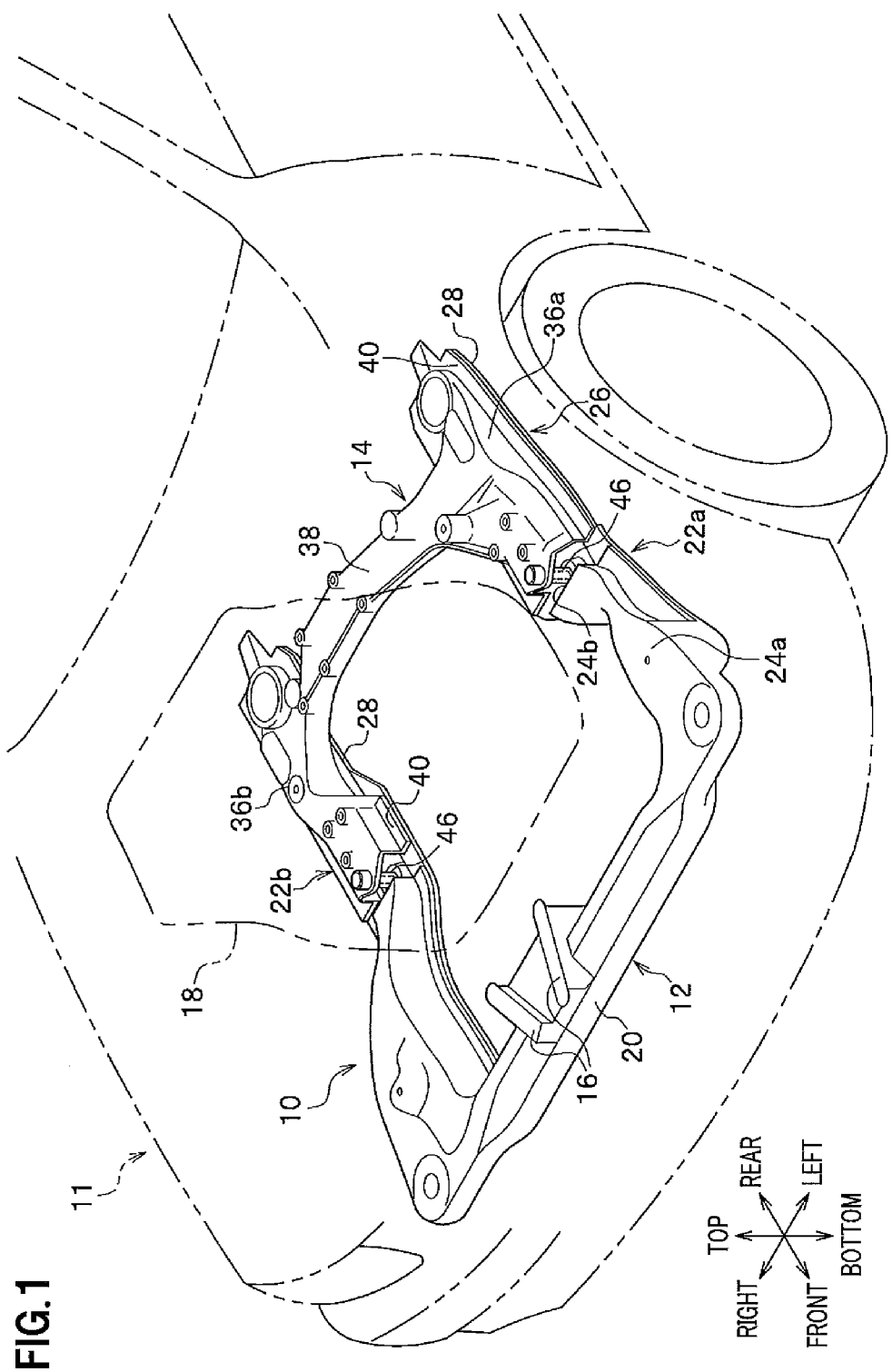
FIG. 1 shows a schematic perspective view showing a state in which a subframe structure according to a first embodiment of the present invention is mounted in the front of an automobile.
Figure 2:
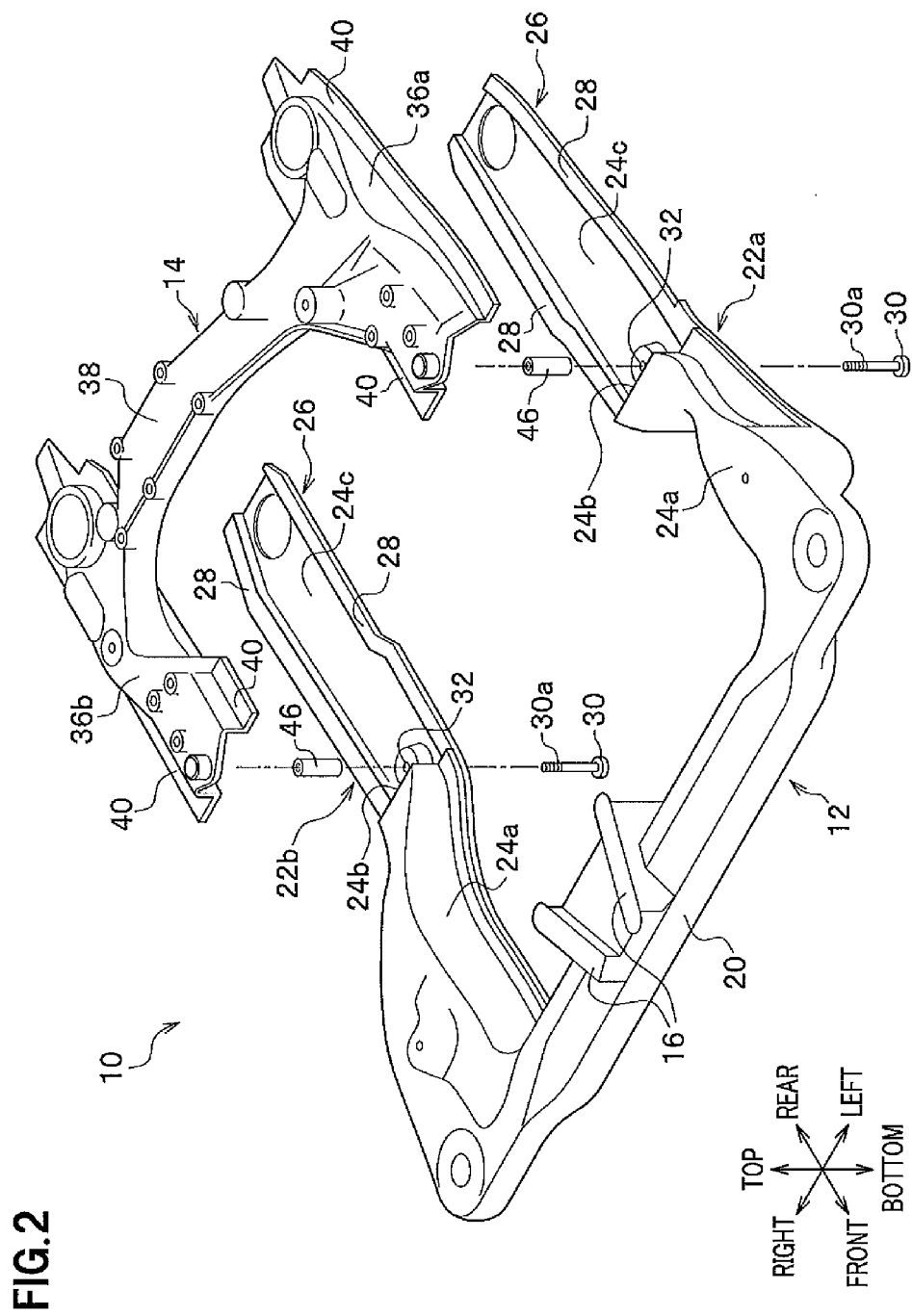
FIG. 2 is an exploded perspective view of the subframe structure according to the first embodiment.
Figure 4:
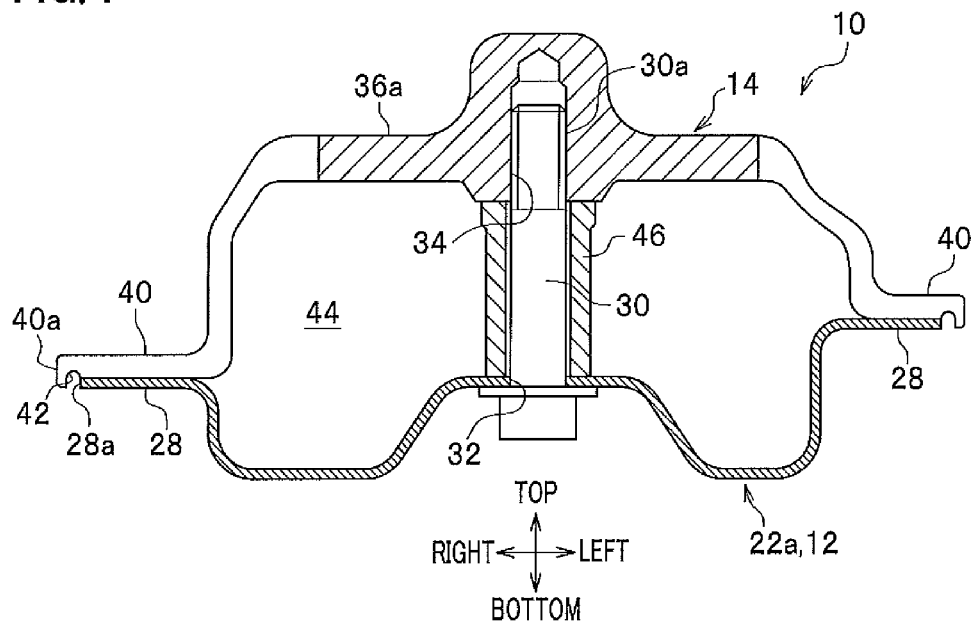
FIG. 4 is a vertical cross-sectional view taken along the line A-A in FIG. 3A.
Figure 5:
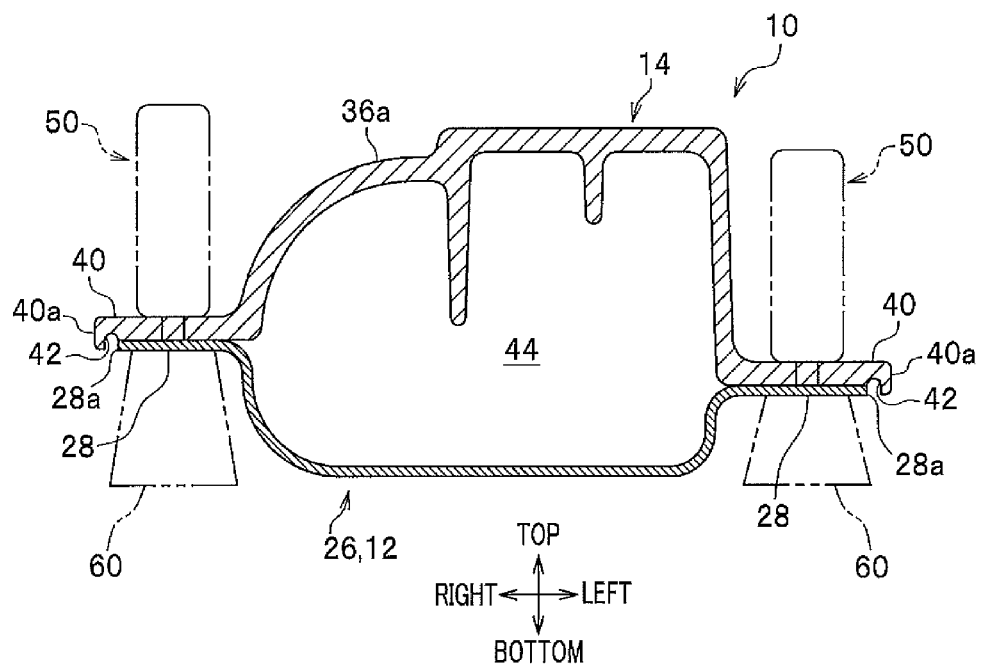
FIG. 5 is a vertical cross-sectional view taken along the line B-B in FIG. 3A.

Next, referring to the drawings as required, embodiments of the present invention will be described in detail. FIG. 1 is a schematic perspective view showing a state in which a subframe structure according to a first embodiment of the present invention is mounted in the front of an automobile. FIG. 2 is an exploded perspective view of the subframe structure according to the first embodiment. FIG. 3A is a plan view of the subframe structure according to the first embodiment. FIG. 3B is a partial plan view of a front subframe in a state in which a rear subframe is removed from the subframe structure. FIG. 4 is a vertical cross-sectional view taken along the line A-A in FIG. 3A. FIG. 5 is a vertical cross-sectional view taken along the line B-B in FIG. 3A.

As shown in FIG. 1, a subframe structure 10 according to the first embodiment of the present invention is arranged at the front of a vehicle body and provided so as to be fixed to a vehicle-body member (frame member) not shown or provided so as to be floatably supported by a floating mechanism not shown. Supporting the subframe structure 10 by the floating mechanism not shown brings about the advantage that vibration transmitted from the vehicle-body member can be suitably absorbed.

As shown in FIG. 1 to FIGS. 3A and 3B, the subframe structure 10 is divided in the front-rear direction of the vehicle and includes a front subframe 12 made of steel and a rear subframe 14 made of light metal. Selected structural details of flange structures of the front and rear subframes 12, 14 are omitted from FIGS. 1 and 2 of the drawings for illustrative purposes, but such structural details are shown in FIGS. 4-7C. The front subframe 12 includes a press-formed body formed by, e.g., pressing of a steel plate member not shown. The rear subframe 14 includes a die-cast body formed by, e.g., die casting in which an aluminum alloy (aluminum) melted in the cavity of a die (die casting machine) not shown is solidified.

Note that in each of the figures, "front" and "rear" represent the front and rear sides of a vehicle 11 (see FIG. 1), respectively, in the front-rear direction of the vehicle, and "left" and "right" represent the left and right sides of the vehicle 11, respectively, in the width direction of the vehicle.

As shown in FIG. 2, the front subframe 12 supports the vehicle front-side of an engine 18 (see FIG. 1) via a front engine mount not shown and attached to a mount section (seat) 16, and has a front cross member 20 that extends in the width direction of the vehicle and a pair of left and right side members 22a and 22b connected to both ends of the front cross member 20 along the axis direction thereof and extending from the front cross member 20 to the rear of the vehicle in parallel with each other.

Note that the front cross member 20 and the pair of left and right side members 22a and 22b may be integrally formed by, e.g., casting, forging, or the like, or the front ends of the pair of left and right side members 22a and 22b may be joined by welding to both ends of the front cross member 20 along the axis direction thereof.

The front cross member 20 includes a hollow member made of a steel material. In addition, front sections 24a ahead of central sections (intermediate sections) 24b of the pair of left and right side members 22a and 22b along the axis direction thereof include hollow members made of a steel material. Moreover, the central sections 24b of the pair of left and right side members 22a and 22b along the axis direction thereof and rear sections 24c behind the central sections 24b include thin plate sections 26 made thinner than the front sections 24a.

In this case, the thin plate sections 26 of the pair of left and right side members 22a and 22b are formed as extending sections extending (elongating) by a prescribed length toward the rear side compared with conventional left and right side members. Further, as shown in FIG. 4, the central sections 24b and the thin plate sections 26 of the pair of left and right side members 22a and 22b are formed by single thin plates to have substantially hat-like vertical cross sections, and flange sections 28 extending along the axis direction thereof are formed on both left and right sides of the left and right side members 22a and 22b (although the right side member 22b is omitted in FIG. 4).

The central sections 24b of the pair of left and right side members 22a and 22b along the axis direction thereof have bolt insertion holes 32 formed therein for the insertion of bolts. In this case, as shown in FIG. 4, a pair of bolts 30 penetrates from the bottom side along the bolt insertion holes 32 of the left and right side members 22a and 22b so that screw sections 30a of the bolts 30 can be fastened to bottomed screw holes 34 provided at the front ends of the rear subframe 14. As a result, the front subframe 12 and the rear subframe 14 are fixed together by the pair of bolts 30 at the positions on both left and right sides along the width direction of the vehicle.

The rear subframe 14 includes a rear member supporting the vehicle rear-side of the engine 18 via a rear engine mount not shown and extending along the width direction of the vehicle. The rear portion of the front subframe 12 is coated on the respective upper surfaces of the central sections 24b and the thin plate sections 26 behind the central sections 24b of the left and right side members 22a and 22b. The rear subframe 14 includes a pair of left and right rear side sections 36a and 36b covering (superposing) some of the upper surfaces of the left and right rear side members 22a and 22b, and a rear cross section 38 connecting the pair of left and right rear side sections 36a and 36b to each other, with areas where the rear cross section 38 connects to each of the side sections defining connecting portions 39, as shown in FIG. 3A. The rear subframe 14 is made of a light metal material such as, e.g., aluminum, magnesium, and the alloy of these substances.

The left and right rear side sections 36a and 36b have flange sections 40 provided on both sides thereof, and the flange sections 40 are formed so as to extend from one end to the other end of the left and right rear side sections 36a and 36b along the axis direction thereof. In this case, lateral edge sections 40a of the flange sections 40 of the left and right rear side sections 36a and 36b are formed so as to slightly protrude toward both left and right sides along the width direction of the vehicle compared with the flange sections 28 of the left and right side members 22a and 22b (see FIG. 5). The protruding lateral edge sections 40a of the flange sections 40 of the left and right rear side sections 36a and 36b have concave sections 42 recessed toward the top side and having ceiling surfaces 42a (see FIGS. 7A-7C), and the concave sections 42 extend along the axis direction of the left and right rear side sections 36a and 36b.

In other words, the concave sections 42 having the ceiling surfaces 42a define grooves which are formed between the lateral edge sections 40a and lateral end surfaces 28a of the flange sections 28 of the left and right side members 22a and 22b. In addition, the flange sections 40 are formed in such a manner that the lateral edge sections 40a of the flange sections 40 of the left and right rear side sections 36a and 36b (rear subframe 14) slightly protrude outwardly beyond adjacent portions of the left and right side members 22a and 22b along the width direction of the vehicle, respectively, compared with the flange sections 28 of the left and right side members 22a and 22b (front subframe 12) and then the protruding lateral edge sections extend toward the vertically downward direction beyond the upper surfaces of the flange sections of the left and right side members 22a and 22b, as shown.

Figure 7A:
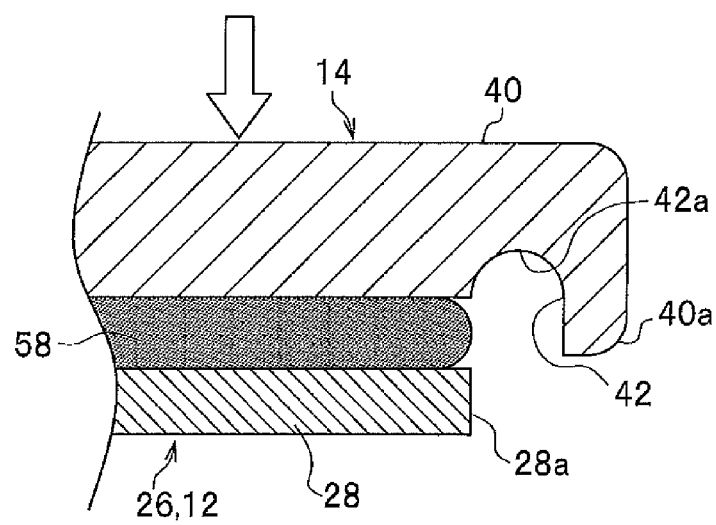
FIGS. 7A to 7C are explanatory views showing a state in which sealants remain in concave sections.
Figure 7B:
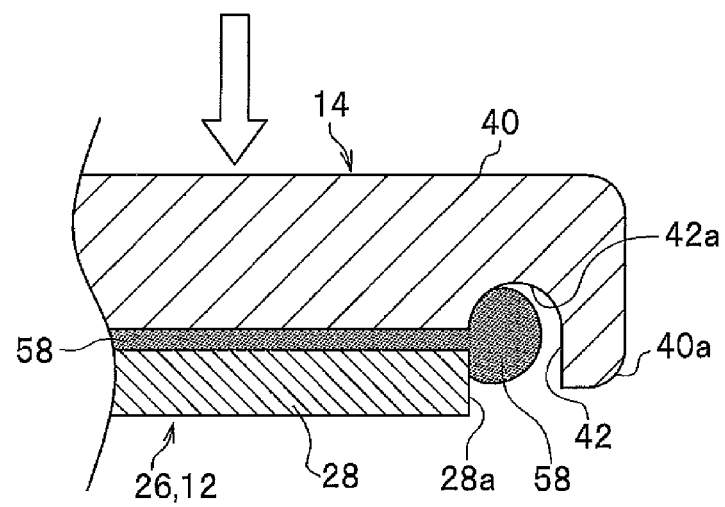
Figure 7C:
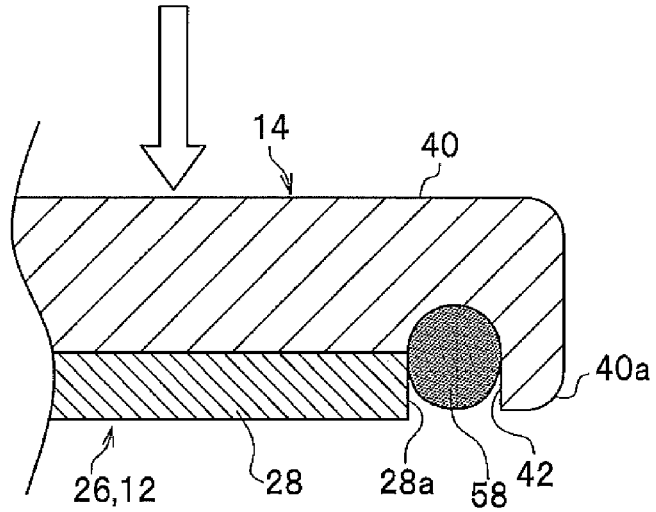

Note, with reference to FIG. 7C that the lower surfaces of the lateral edge sections 40a, which extend toward the vertically downward direction, of the flange sections 40 of the left and right rear side sections 36a and 36b may be provided so as to be on the same or substantially the same level as the lower surfaces of the flange sections 28 of the left and right side members 22a and 22b along the horizontal direction when the welding operation between the flanges 40, 28 is concluded.

In this case, the flange sections 28 provided on both left and right sides of the left and right side members 22a and 22b are positioned on the lower side, and the flange sections 40 provided on both left and right sides of the left and right rear side sections 36a and 36b are positioned on the upper side. When the flange sections 28 and 40 are integrally joined together by friction stir welding in their superposed state, closed cross sections 44 are formed (see FIG. 4 and FIG. 5).

In addition, the left and right side members 22a and 22b and the left and right rear side sections 36a and 36b of the rear member are fastened together when the bolts 30 inserted into the bolt insertion holes 32 provided at the central sections are screwed into the screw holes 34 provided in the left and right rear side sections 36a and 36b so as to penetrate the closed cross sections 44.

Inside the closed cross sections 44, collar members 46 are provided that include cylindrical bodies surrounding the peripheral surfaces of the bolts 30 and reinforce the joining strength between the left and right side members 22a and 22b and the left and right rear side sections 36a and 36b when the bolts 30 are fastened. The bolts are fastened at non-joining portions at which the front subframe 12 and the rear subframe 14 are not joined together by the friction stir welding that will be described later, and the non-joining portions at which welding is not allowed can be reinforced by the fastening of the bolts. As a result, even in a case in which the front subframe 12 made of steel and the rear subframe 14 made of light metal are mutually joined together by the friction stir welding, desired rigidity and strength can be ensured in cooperation with bolt fastening portions serving as the non-joining portions.

Accordingly, the front subframe 12 and the rear subframe 14 are firmly fixed (joined) together when the respective flange sections 28 and 40 are joined together by the friction stir welding at their superposed portions. In addition, the front subframe 12 and the rear subframe 14 are fastened together by the bolts 30 at the non-welding portions not subjected to the friction stir welding. Thus, the rigidity and strength of the entire subframe structure 10 can be further increased. Note that if female screw holes (not shown) are formed at positions behind the fastening portions of the bolts 30 in the left and right rear side sections 36a and 36b and reinforcing bolts, not shown, are inserted from below the rear sections 24c of the left and right side members 22a and 22b so as to be fastened to the female screw holes, the rigidity and strength can be further increased.

Figure 6A:
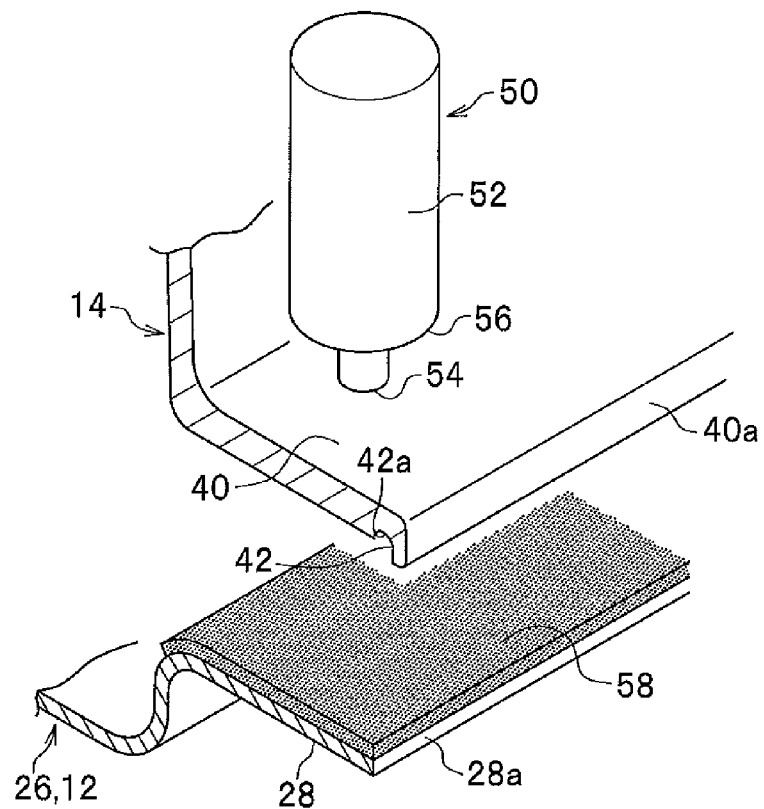
FIG. 6A is a perspective view showing a state in which friction stir welding is performed using a joining tool.
Figure 6B:
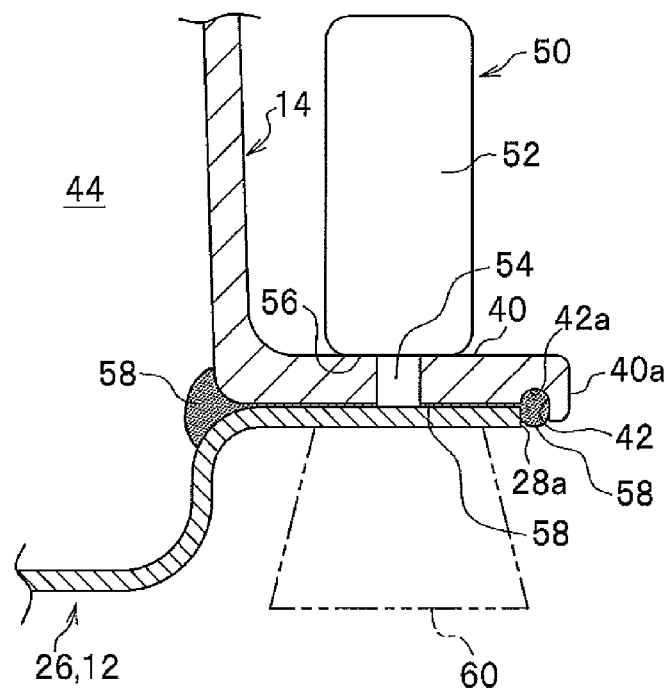
FIG. 6B is a vertical cross-sectional view showing the state of the friction stir welding.

The subframe structure 10 according to the first embodiment is basically configured as described above. Next, the functions and effects of the subframe structure will be described. FIG. 6A is a perspective view showing a state in which the friction stir welding is performed using a joining tool. FIG. 6B is a vertical cross-sectional view showing the state of the friction stir welding.

First, a description will be given of the process of integrally joining together the superposed portions between the flange sections 28 on the side of the front subframe 12 made of a steel material and the flange sections 40 on the side of the rear subframe 14 made of an aluminum alloy material by the friction stir welding.

As shown in FIGS. 6A and 6B, a joining tool 50 for use in the friction stir welding has a cylindrical rotor (Stir Rod) 52 rotated and driven about a rotating shaft by a rotating and driving source such as a motor not shown and has a joining pin (Probe) 54 protruding from the bottom center of the rotor 52 along the direction of the shaft. The diameter of the joining pin 54 is set to be smaller than that of the rotor 52, and a shoulder section 56 is formed at the annular step section between the joining pin 54 and the rotor 52.

Next, the process of joining the front subframe 12 and the rear subframe 14 together will be described. Note that the front subframe 12 includes a press-formed body formed by pressing a steel plate member, while the rear subframe 14 includes a die-cast body formed by die-casting with an aluminum alloy.

First, the front subframe 12 is mounted on a clamp board not shown, and then sealants 58 (e.g., air-dry sealants) are applied onto the upper surfaces of the front subframe 12 by a sealant application mechanism not shown. After the rear subframe 14 is coated on the upper surfaces (the thin plate sections 26 behind the central sections 24b) of the front subframe 12 having the sealants 58 applied thereto, the front subframe 12 and the rear subframe 14 superposed in the top-bottom direction are clamped by a clamp mechanism not shown.

Subsequently, the flange sections 28 of the front subframe 12 and the flange sections 40 of the rear subframe 14 are joined together by the friction stir welding using the joining tool 50 described above. Note that jigs 60 for supporting welding force to be applied to the respective flange sections 28 and 40 by the joining tool 50 are provided beneath the respective flange sections 28 and 40 of the front subframe 12 and the rear subframe 14.

Next, the outline of the process of the friction stir welding is as follows. Note that the details of the process of the friction stir welding will be described later.

The rotor 52 and the joining pin 54 is caused to gradually come close to the upper surfaces of the rear subframe 14 made of a light metal material such as an aluminum alloy while being integrally rotated by the rotating and driving source not shown, and then the tip end of the joining pin 54 is brought into contact with the upper surfaces of the rear subframe 14 by welding force (pressing force) so as be rotated to penetrate. Thus, plastic flow areas are generated in the rear subframe 14.

Moreover, the rotor 52 and the joining pin 54 are pressed to penetrate while being integrally rotated, and the joining pin 54 is inserted in the vertically downward direction until the shoulder section 56 of the rotor 52 slides on the upper surfaces of the rear subframe 14. On this occasion, the welding force is applied until the tip end of the joining pin 54 is brought into contact with the upper surfaces of the front subframe 12 made of a steel material.

When the joining pin 54 is rotated to penetrate until it is brought into contact with the upper surfaces of the front subframe 12, the plastic flow areas generated in the rear subframe 14 made of a light metal material are plastically flowed and the new surfaces of the steel plates of the front subframe 12 made of a steel material are exposed. Thus, the front subframe 12 is solid-phase welded to the rear subframe 14.

As described above, when the rotor 52 and the joining pin 54 are displaced along the axis direction of the superposed flange sections 28 and 40 while maintaining a state in which the rotor 52 and the joining pin 54 are rotated to penetrate and the tip end of the joining pin 54 is brought into contact with the upper surfaces of the front subframe 12, friction stir welding portions 62 (see netted sections in FIG. 3A) are formed. Note that at the friction stir welding portions 62, intermetallic compounds are generated at the joining interfaces between the rear subframe 14 (light metal material such as an aluminum alloy) on the top side and the front subframe 12 (steel material) on the bottom side. The intermetallic compounds are generated so as to be dispersed in the joining interfaces in a granular form or a divided layered form rather than a continuous layered form extending over the entire joining interfaces.

In the first embodiment, the front subframe 12 includes a press-formed body made of steel, and the rear subframe 14 includes a die-cast body made of light metal. Thus, desired rigidity and strength can be ensured at the installation or the like of a suspension component such as a suspension arm not shown, and shock absorption performance at collision can be enhanced.

In addition, in the first embodiment, the rear subframe 14 includes an aluminum die-cast body made of, e.g., an aluminum alloy or the like. Thus, the weight reduction of the entire subframe structure 10 can be achieved. Moreover, in the first embodiment, the rear member conventionally including two members, i.e., upper and lower members is integrated, and various reinforcing components provided in the hollow rear member are integrally formed by die-casting. Thus, with a reduction in the number of components, the weight reduction can be further achieved.

Further, in the first embodiment, the left and right rear side sections 36a and 36b of the rear subframe 14 made of light metal such as, e.g., an aluminum alloy are superposed on the upper surfaces of the thin plate sections (extending sections) 26 having the substantially hat-like vertical cross sections formed in the front subframe 12 made of steel to join the flange sections 28 and 40 together. Thus, desired rigidity and strength can be ensured at the installation or the like of a suspension component such as the suspension arm not shown, and shock absorption performance at collision can be enhanced.

Furthermore, in the first embodiment, the rear subframe 14 having the pair of left and right rear side sections 36a and 36b and the rear cross section 38 is made of a light metal material such as, e.g., an aluminum alloy. Thus, the weight reduction can be further achieved than before.

FIGS. 7A to 7C are explanatory views showing a state in which the sealants remain in the concave sections.

Hereinafter, a description will be given, based on FIGS. 7A-7C, of a sealant remaining structure in which the sealants 58 interposed between the front subframe 12 and the rear subframe 14 are protruded from both left and right sides and remain in the concave sections 42.

When the rear subframe 14 is superposed on the front subframe 12 having the sealants 58 applied onto the upper surfaces thereof (see FIG. 7A) and then the front and rear subframes are clamped by the clamp mechanism not shown, the sealants 58 are slightly protruded from both left and right sides of the front subframe 12 and the rear subframe 14 (see FIG. 7B).

The sealants 58 protruded from both left and right sides of the superposed front subframe 12 and the rear subframe 14 remain in the concave sections 42 having the ceiling surfaces 42a. Moreover, when the front subframe 12 and the rear subframe 14 are joined together by the friction stir welding in their clamped state, the sealants 58 are further protruded from both left and right sides. As a result, the necessary and sufficient amount of the sealants 58 is held in the concave sections 42 (see FIG. 7C).

If the sealants 58 held in the concave sections 42 include, e.g., air-dry sealants, they solidify after the lapse of a prescribed period of time to seal the gaps on the left and right sides of the front subframe 12 and the rear subframe 14. As a result, in the embodiment, the scattering of the sealants 58 protruded from both left and right sides of the front subframe 12 and the rear subframe 14 joined together by the friction stir welding is prevented, and the intrusion of water from the gaps on both left and right sides of the front subframe 12 and the rear subframe 14 is prevented. Thus, high antirust performance can be ensured.

In addition, an operator can visually confirm the remaining degree (remaining amount) of the sealants 58 in the concave sections 42 from the outside. Therefore, by confirming the application amount of the sealants 58, the operator can determine whether the sealants 58 have been reliably interposed between the front subframe 12 and the rear subframe 14.

Moreover, although the closed cross sections 44 are formed between the front subframe 12 and the rear subframe 14 when the flange sections 28 and 40 are joined together by the friction stir welding, the sealants 58 are also protruded toward areas inside the flange sections 28 and 40 where the closed cross sections are formed and solidified to exhibit the sealing function (see FIG. 6B). Thus, water remaining prevention structure can be obtained in which water droplets do not remain in the gaps between the respective flange sections 28 and 40 even if the water droplets (water) fall down along the inner wall surfaces of the rear subframe 14.

Furthermore, when the different types of the materials of the front subframe 12 made of a steel member and the rear subframe 14 made of an aluminum member are joined together by the friction stir welding, there is a concern that a potential difference occurs between the respective metal materials, due to a difference in the ionization of the respective metal materials, and corrosion is caused by the contact between the different types of the metal materials when corrosion current flows. However, in the embodiment, the flow of corrosion current can be prevented by the solidification of the electrically non-conductive sealants 58 protruded from the flange sections 28 and 40 joined together by the friction stir welding. As a result, in the embodiment, resistance to corrosion caused by the contact between the different types of the metal materials can be enhanced.

Next, a subframe structure 100 according to a second embodiment of the present invention will be described below. Note that in the following embodiment, the same constituents as those of the subframe structure 10 according to the first embodiment shown in FIG. 1 will be denoted by the same reference symbols and their detailed descriptions will be omitted.

Figure 8:
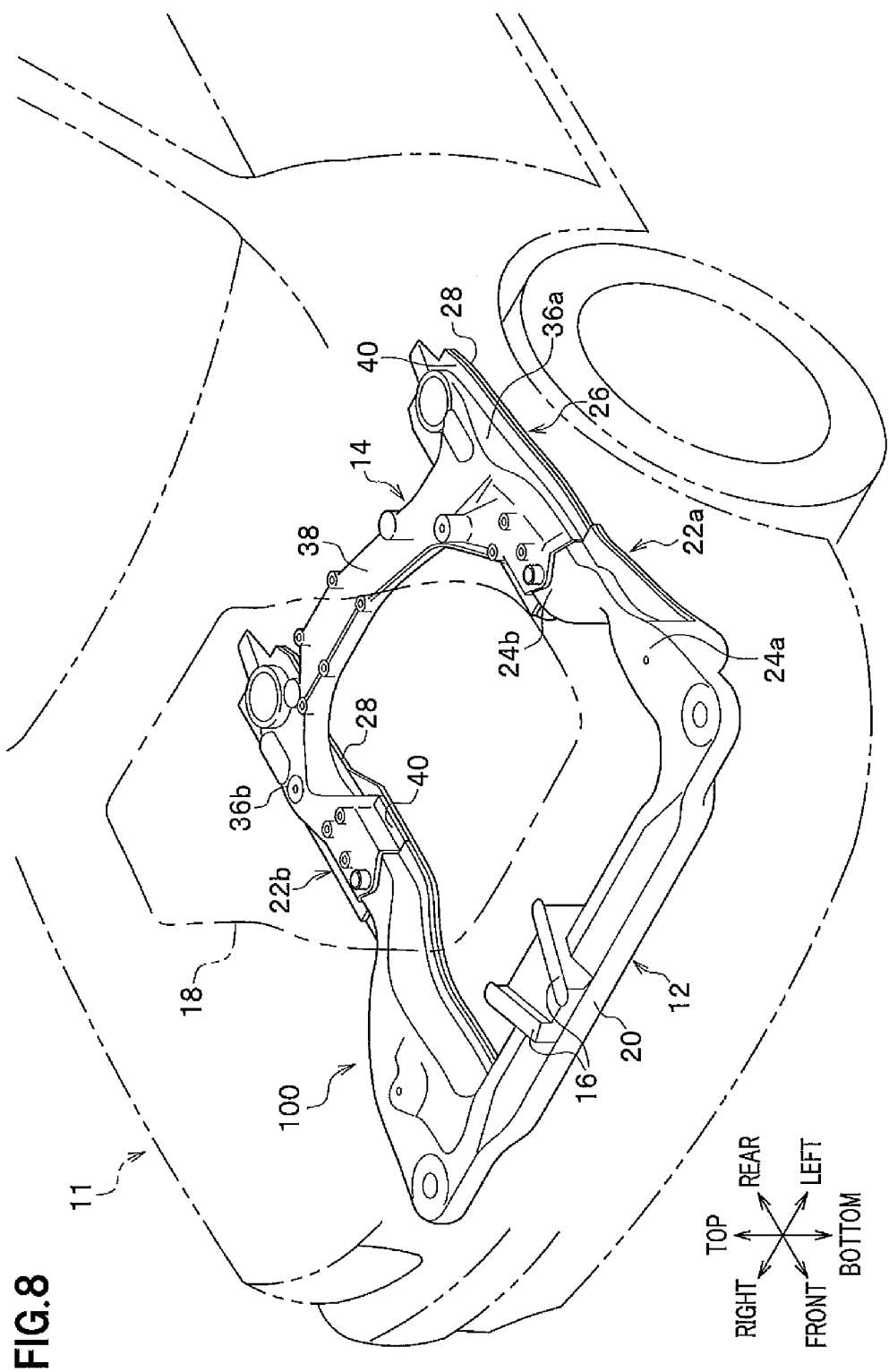
FIG. 8 is a schematic perspective view showing a state in which a subframe structure according to a second embodiment of the present invention is mounted in the front of the automobile.
Figure 9:
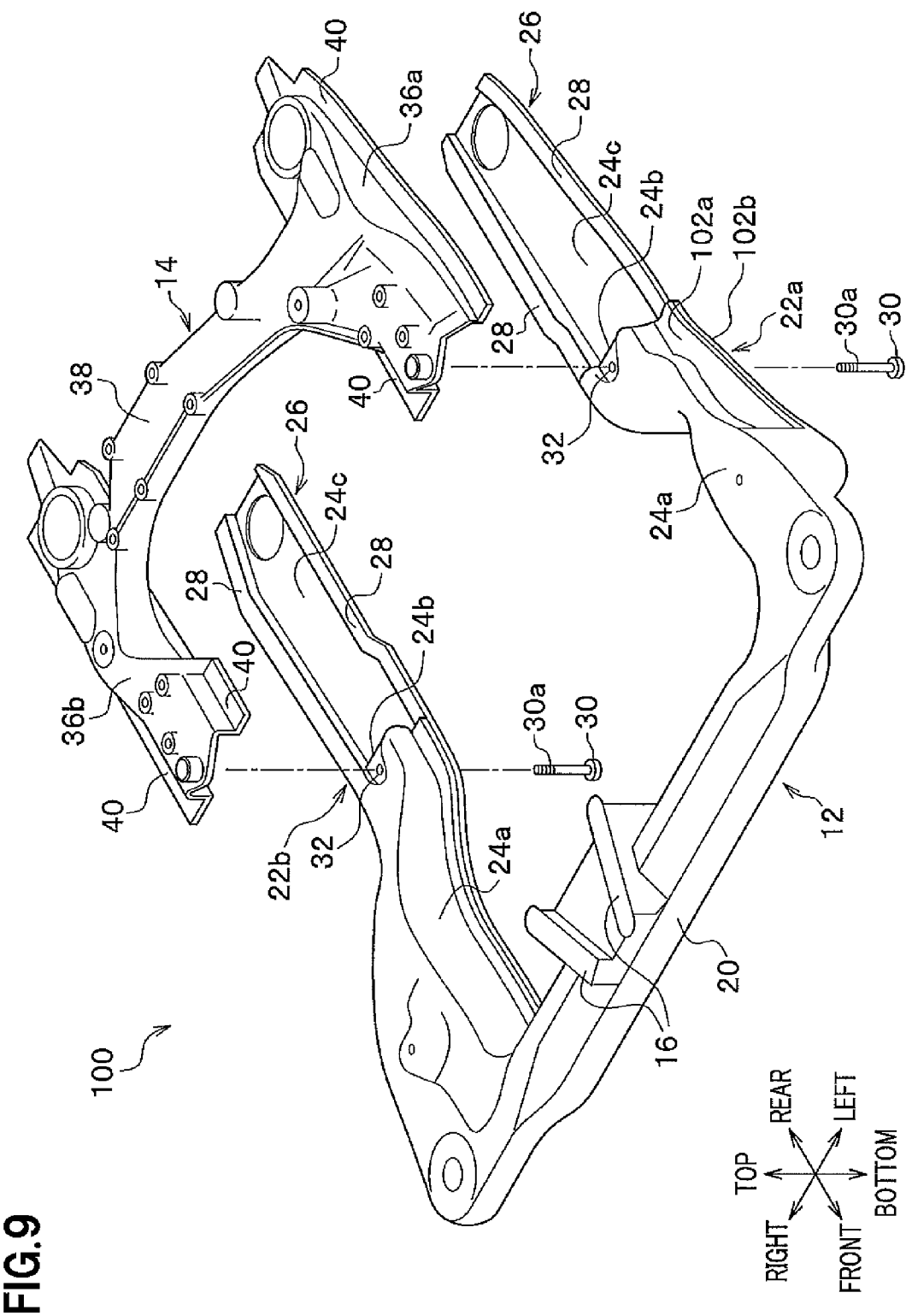
FIG. 9 is an exploded perspective view of the subframe structure according to the second embodiment.
Figure 11:
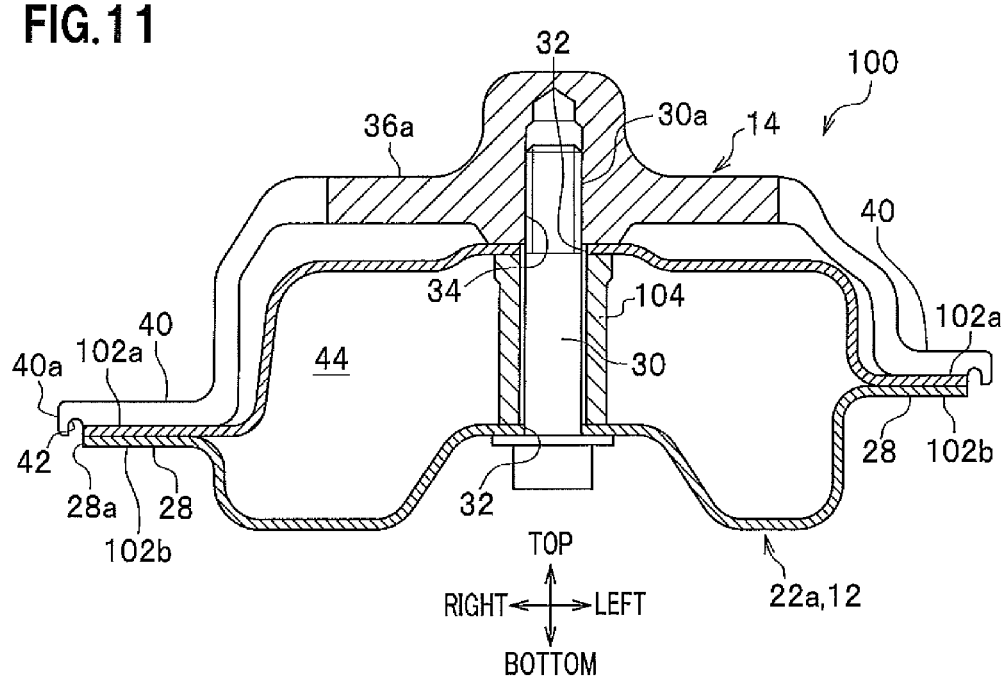
FIG. 11 is a vertical cross-sectional view taken along the line C-C in FIG. 10A.
Figure 12:
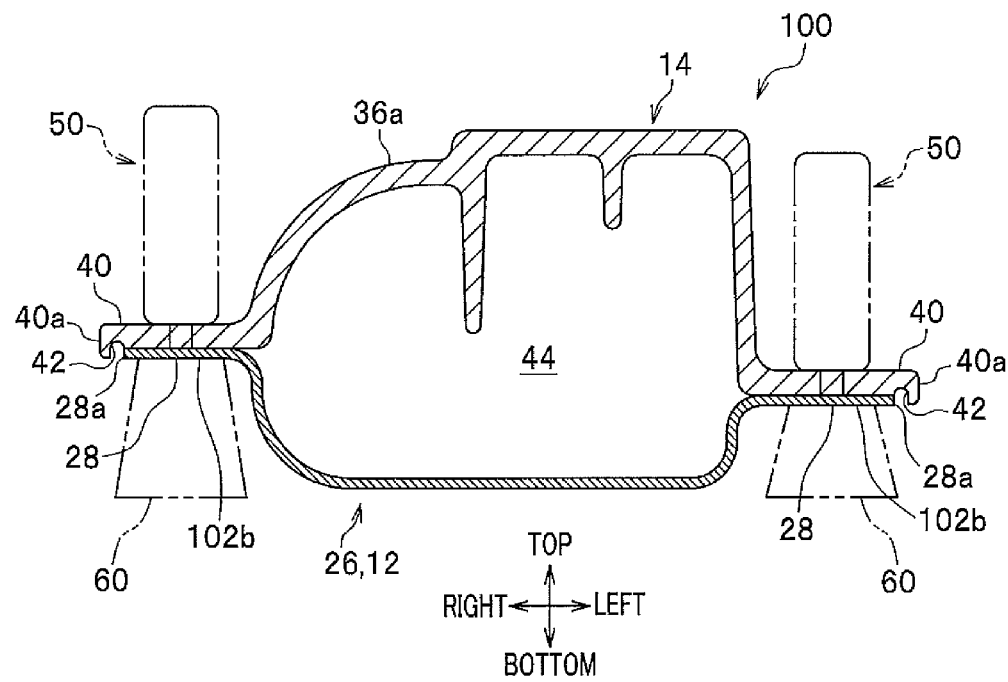
FIG. 12 is a vertical cross-sectional view taken along the line D-D in FIG. 10A.

FIG. 8 is a schematic perspective view showing a state in which the subframe structure according to the second embodiment of the present invention is mounted in the front of the automobile. FIG. 9 is an exploded perspective view of the subframe structure according to the second embodiment. FIG. 10A is a plan view of the subframe structure according to the second embodiment. FIG. 10B is a partial plan view of the front subframe in a state in which the rear subframe is removed from the subframe structure. FIG. 11 is a vertical cross-sectional view taken along the line C-C in FIG. 10A. FIG. 12 is a vertical cross-sectional view taken along the line D-D in FIG. 10A.

In the subframe structure 100 according to the second embodiment, as shown in FIG. 11, bolt fastening portions at the central sections 24b of the left and right side members 22a and 22b of the front subframe 12 have the closed cross sections 44 formed when two thin plates 102a and 102b made of a steel material are joined together. Accordingly, the subframe structure 100 according to the second embodiment is different from the subframe structure 10 according to the first embodiment in which the bolt fastening portions of the left and right side members 22a and 22b each include the single steel plate and the closed cross sections 44 (see FIG. 4) are formed between the front subframe 12 and the rear subframe 14.

In this case, the two thin plates 102a and 102b configuring the left and right side members 22a and 22b have the bolt insertion holes 32 and 32 for the insertion of the bolts 30. The bolt insertion holes 32 and 32 are provided so that the screw sections 30a of the bolts 30 inserted along the bolt insertion holes 32 and 32 penetrate the closed cross sections 44 formed by the two thin plates 102 and 102b when screwed into the screw holes 34 of the rear subframe 14.

Note that in the closed cross sections 44, there are provided collar members 104 each including a cylindrical body surrounding the peripheral surface of the bolt 30 and having one end thereof connected to the one thin plate 102a along the axis direction thereof and the other end thereof connected to the other thin plate 102b along the axis direction thereof. The collar members 104 are provided to prevent the deformation of the thin plates 102a and 102b due to the fastening of the bolts 30 and reinforce joining strength at the bolt fastening portions. In this case, the collar members 104 may be integrally formed with the lower thin plates 102b or may be welded in advance to the upper surfaces of the thin plates 102 for fixation. In addition, for the fastening of the bolts 30 penetrating the closed cross sections 44 formed by the two thin plates 102a and 102b, peripheral bolt fastening portions may be welded in which the rear subframe 14 made of an aluminum alloy material and the upper thin plates 102 made of a steel material are laminated (see FIG. 11).

In the second embodiment, the two thin plates 102a and 102b made of a steel material are joined together to form closed cross sections 44 in the left and right side members 22a and 22b, which brings about the advantage that the closed cross-sectional areas can be increased. As a result, the rigidity and strength can be further increased.

Next, a subframe structure 200 according to a third embodiment of the present invention will be described below.

Figure 13:
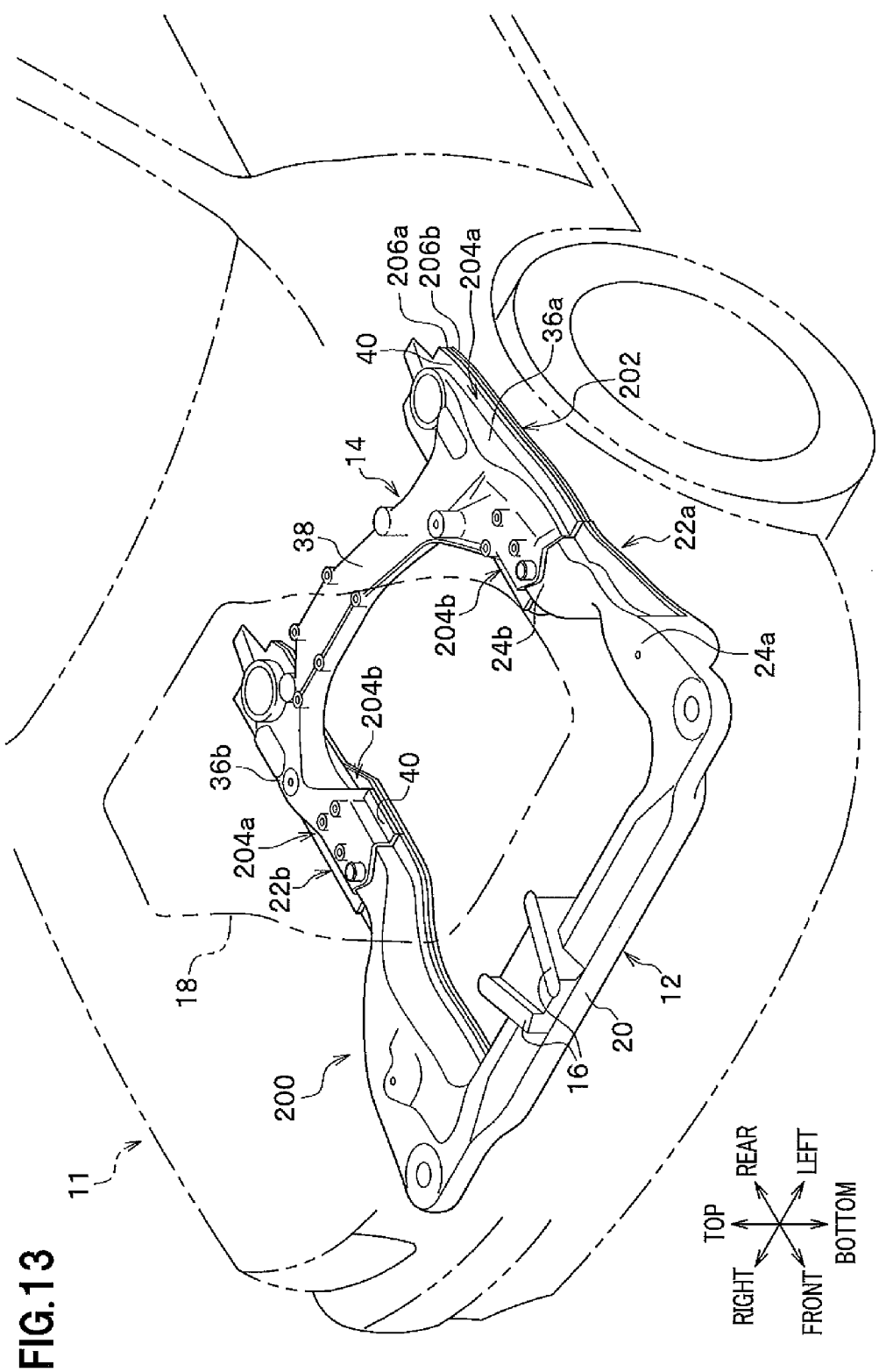
FIG. 13 is a schematic perspective view showing a state in which a subframe structure according to a third embodiment of the present invention is mounted in the front of the automobile.
Figure 14:
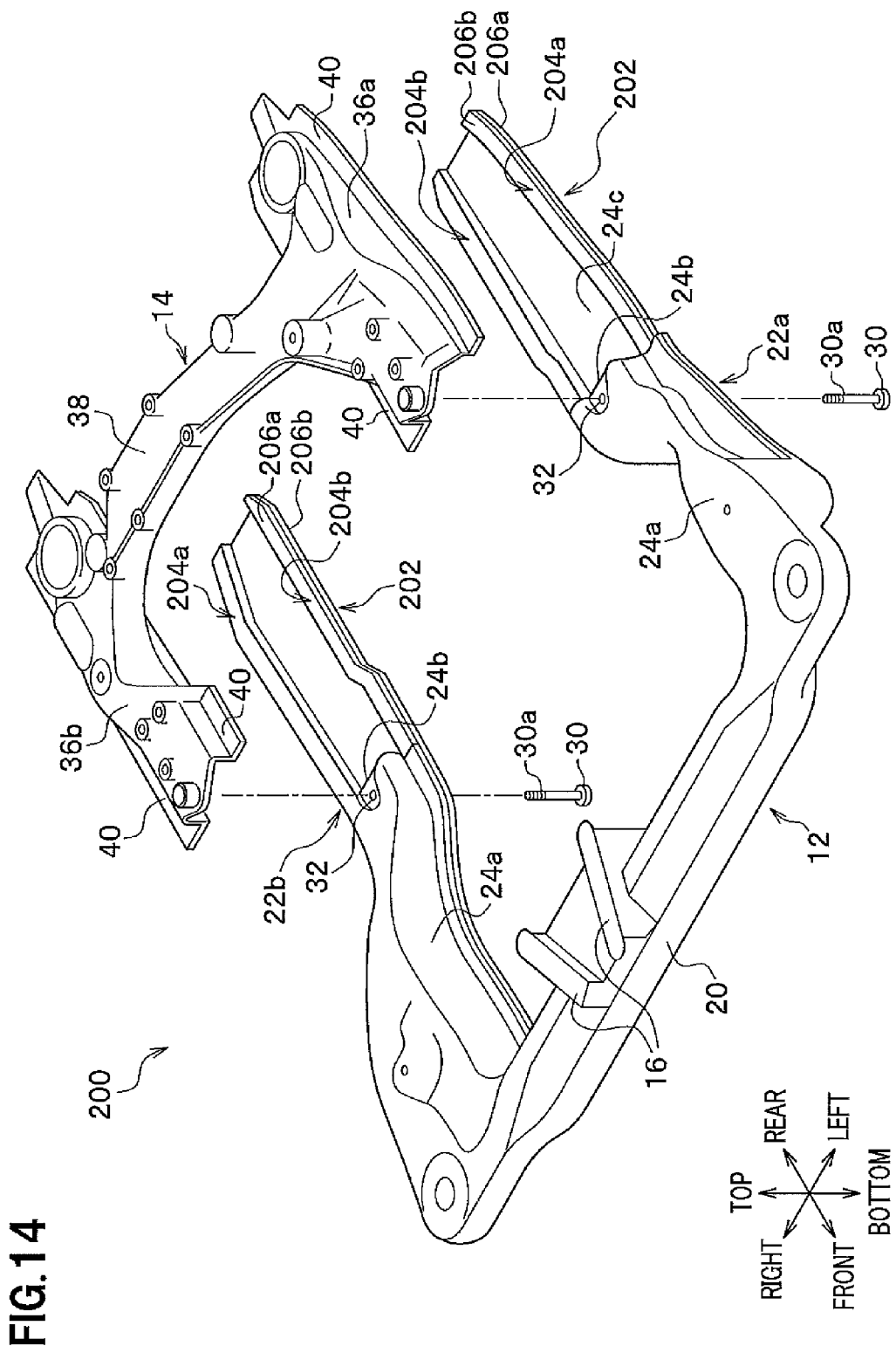
FIG. 14 is an exploded perspective view of the subframe structure according to a third embodiment
Figure 15A:
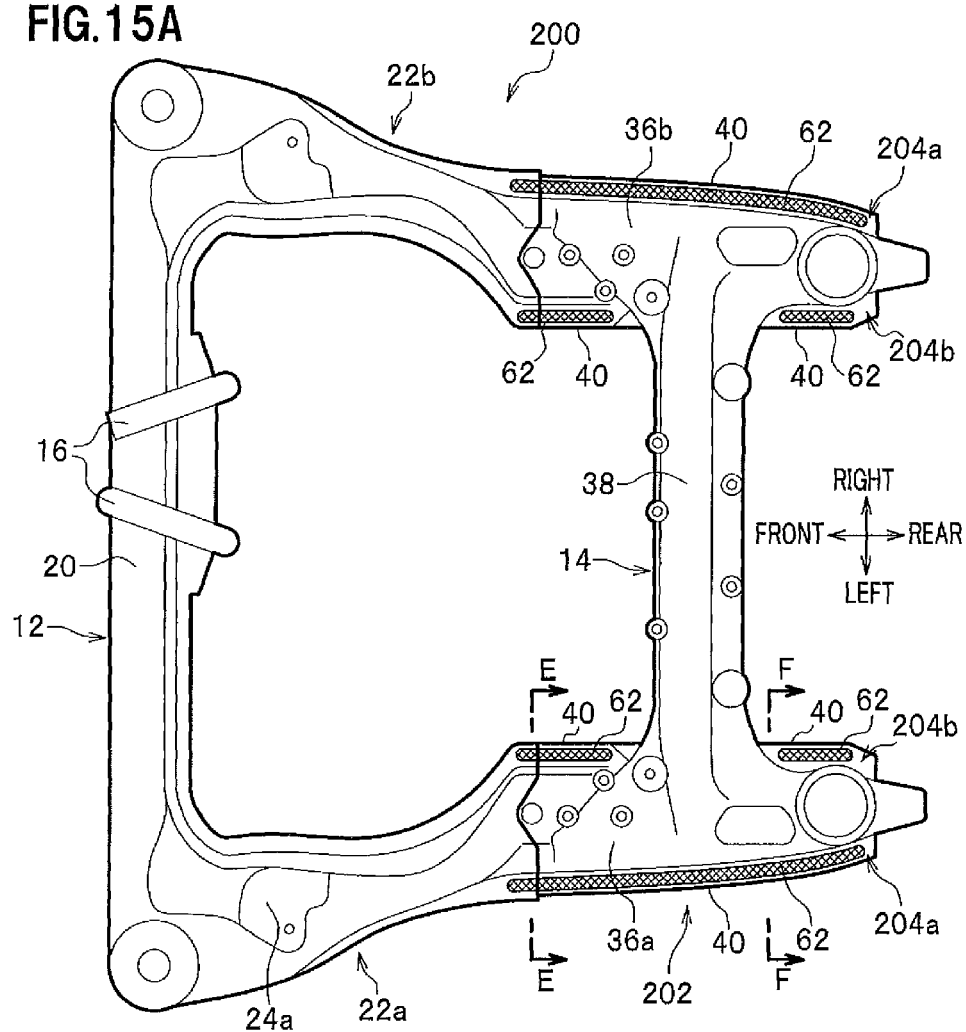
FIG. 15A is a plan view of the subframe structure according to the third embodiment.
Figure 15B:
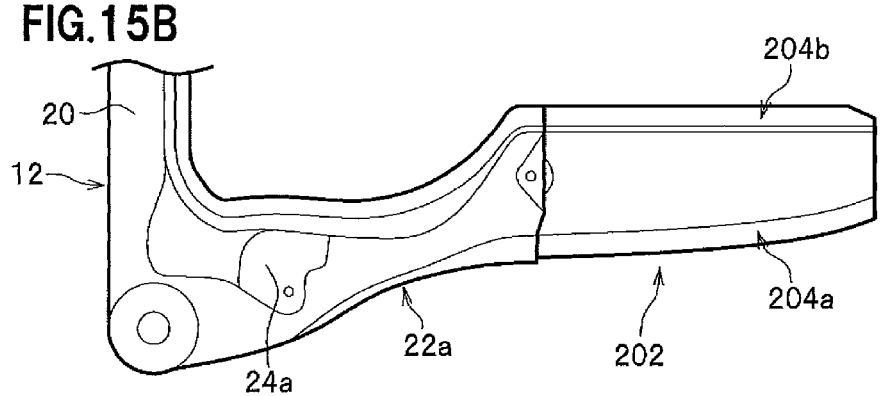
FIG. 15B is a partial plan view of the front subframe in a state in which the rear subframe is removed from the subframe structure.
Figure 16:
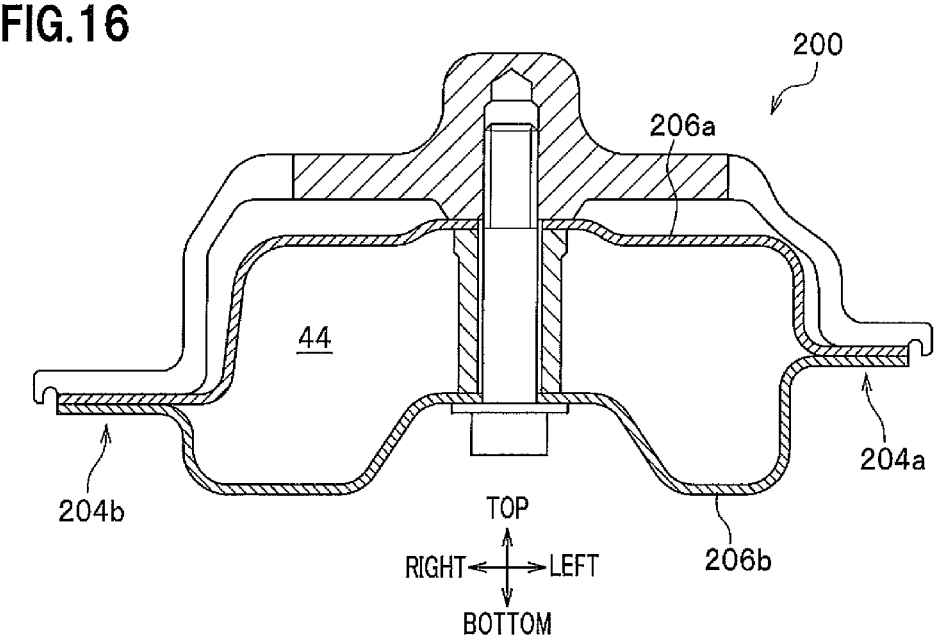
FIG. 16 is a vertical cross-sectional view taken along the line E-E in FIG. 15A.
Figure 17:
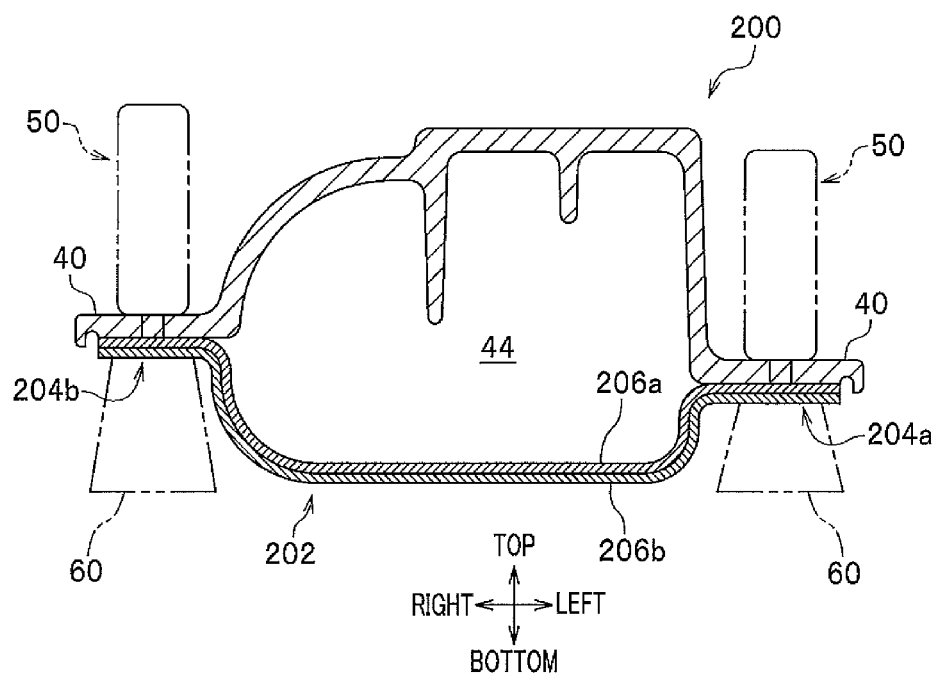
FIG. 17 is a vertical cross-sectional view taken along the line F-F in FIG. 15A.
Figure 18A:
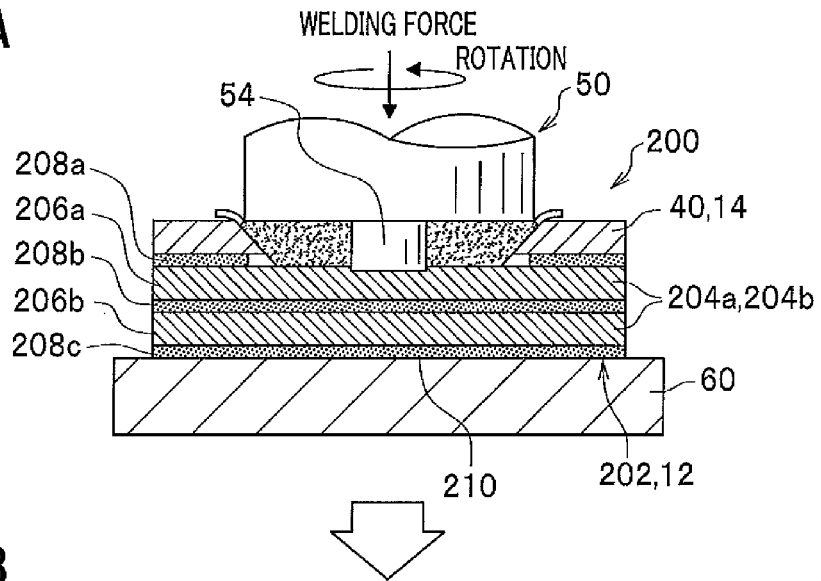
FIG. 18A is a vertical cross-sectional view showing a state in which the respective flange sections of the front subframe and the rear subframe are joined together by the friction stir welding in the subframe structure according to the third embodiment.
Figure 18B:
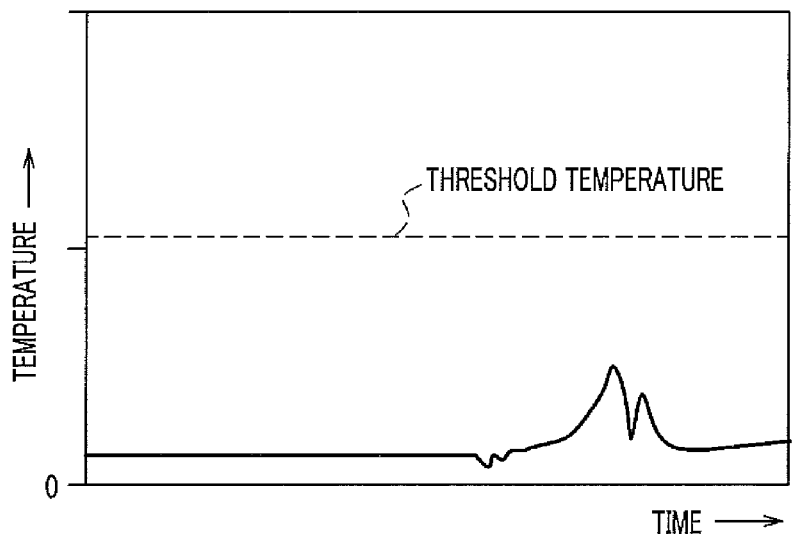
FIG. 18B is a characteristic diagram in which the temperature of the rear surfaces of friction stir welding portions is measured.
Figure 18C:
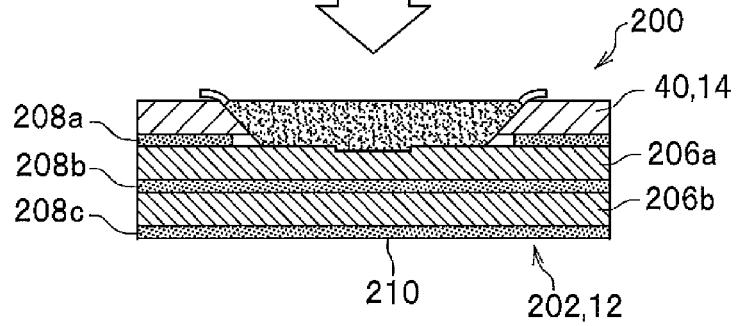
FIG. 18C is a vertical cross-sectional view showing a state after the friction stir welding.

FIG. 13 is a schematic perspective view showing a state in which the subframe structure according to the third embodiment of the present invention is mounted in the front of the automobile. FIG. 14 is an exploded perspective view of the subframe structure according to the third embodiment. FIG. 15A is a plan view of the subframe structure according to the third embodiment. FIG. 15B is a partial plan view of the front subframe in a state in which the rear subframe is removed from the subframe structure. FIG. 16 is a vertical cross-sectional view taken along the line E-E in FIG. 15A. FIG. 17 is a vertical cross-sectional view taken along the line F-F in FIG. 15A. FIG. 18A is a vertical cross-sectional view showing a state in which the respective flange sections of the front subframe and the rear subframe are joined together by the friction stir welding in the subframe structure according to the third embodiment. FIG. 18B is a characteristic diagram in which the temperature of the rear surfaces of friction stir welding portions is measured. FIG. 18C is a vertical cross-sectional view showing a state after the friction stir welding.

As shown in FIG. 14, the subframe structure 200 according to the third embodiment is different from the subframe structures 10 and 100 according to the first and second embodiments in that sections ranging from the central sections 24b of the left and right side members 22a and 22b configuring the front subframe 12 to extending sections 202 (including flange sections 204a and 204b) behind the central sections 24b are made thin by the lamination of two thin plates 206a and 206b made of a steel material and that the entire left and right side members 22a and 22b including the extending sections 202 include the two thin plates 206a and 206b.

In this case, before the front subframe 12 and the rear subframe 14 are joined together by the friction stir welding, electrodeposition coating films 208a to 208c are formed by electrodeposition coating processing on both the front and rear surfaces and the joining surfaces (laminating surfaces) between both the front and rear surfaces of the flange sections 204a and 204b of the left and right side members 22a and 22b (see FIG. 18A).

The flange sections 204a and 204b of the left and right side members 22a and 22b having the two thin plates 206a and 206b laminated thereon as described above and the left and right side sections 36a and 36b of the rear subframe 14 are joined together by the friction stir welding using the joining tool 50. On this occasion, the joining pin 54 of the joining tool 50 is rotated to penetrate the left and right side sections 36a and 36b and brought into contact with the flange sections 204a and 204b of the left and right side members 22a and 22b, which results in the application of friction heat to the left and right side sections 36a and 36b. However, since the left and right side members 22a and 22b include the two laminated thin plates 206a and 206b made of steel at the rear surfaces 210 of the friction stir welding portions, the temperature of the electrodeposition coating films 208c does not reach prescribed temperature (threshold temperature) at which the decomposition of the electrodeposition coating films 208c is allowed (see FIG. 18B). As a result, the separation of the electrodeposition coating films 208c can be prevented (see FIG. 18C).

In other words, friction heat is generated when the joining pin 54 is rotated to penetrate toward the joining objects at the friction stir welding, and the electrodeposition coating films 208c formed on the lower surfaces of the thin plates 206b on the lower layer side out of the two thin plates 206a and 206b made of steel may be separated. In the third embodiment, the sections ranging from the central sections 24b of the left and right side members 22a and 22b configuring the front subframe 12 to the extending sections 202 behind the central sections 24b are made thin by the lamination of the two thin plates 206a and 206b made of a steel material, the transfer of friction heat to the electrodeposition coating films 208c formed on the lower surfaces of the thin plates 206b on the lower layer side is avoided, and the temperature of the portions of the electrodeposition coating films formed on the lower surfaces of the thin plates 206 on the lower layer side is reduced. Thus, the electrodeposition coating films 208c formed on the rear surfaces 210 of the friction stir welding portions are protected.

FIG. 18B is the characteristic diagram in which the temperature of the rear surfaces 210 (the lower surfaces of the thin plates 206b on the lower layer side out of the two laminated thin plates 206a and 206b made of steel) of the friction stir welding portions is measured using a temperature sensor not shown. In this case, although the temperature of the lower surfaces of the thin plates 206b on the lower layer side slightly increases due to the friction stir welding, the temperature of the electrodeposition coating films 208c does not reach the prescribed temperature (threshold temperature) at which the electrodeposition coating films 208c formed on the lower surfaces of the thin plates 206b on the lower layer side are decomposed. Therefore, since the separation of the electrodeposition coating films 208c is prevented, the electrodeposition coating films 208 can be stably protected.

Note that at the joining surfaces between the front subframe 12 and the rear subframe 14, the electrodeposition coating films 208a formed between the thin plates 206a on the upper layer side out of the two laminated thin plates 206a and 206b made of steel and the rear subframe 14 made of light metal such as an aluminum alloy can be reliably extruded outside the joining surfaces by the friction stir welding.

In addition, the third embodiment exemplifies the structure in which the sections ranging from the central sections 24b of the left and right side members 22a and 22b configuring the front subframe 12 to the extending sections 202 (including the flange sections 204a and 204b) behind the central sections 24b are formed by the lamination of the two thin plates 206a and 206b made of a steel material. However, the third embodiment is not limited to the structure, and the number of thin plates may be two or more.

Figure 19:
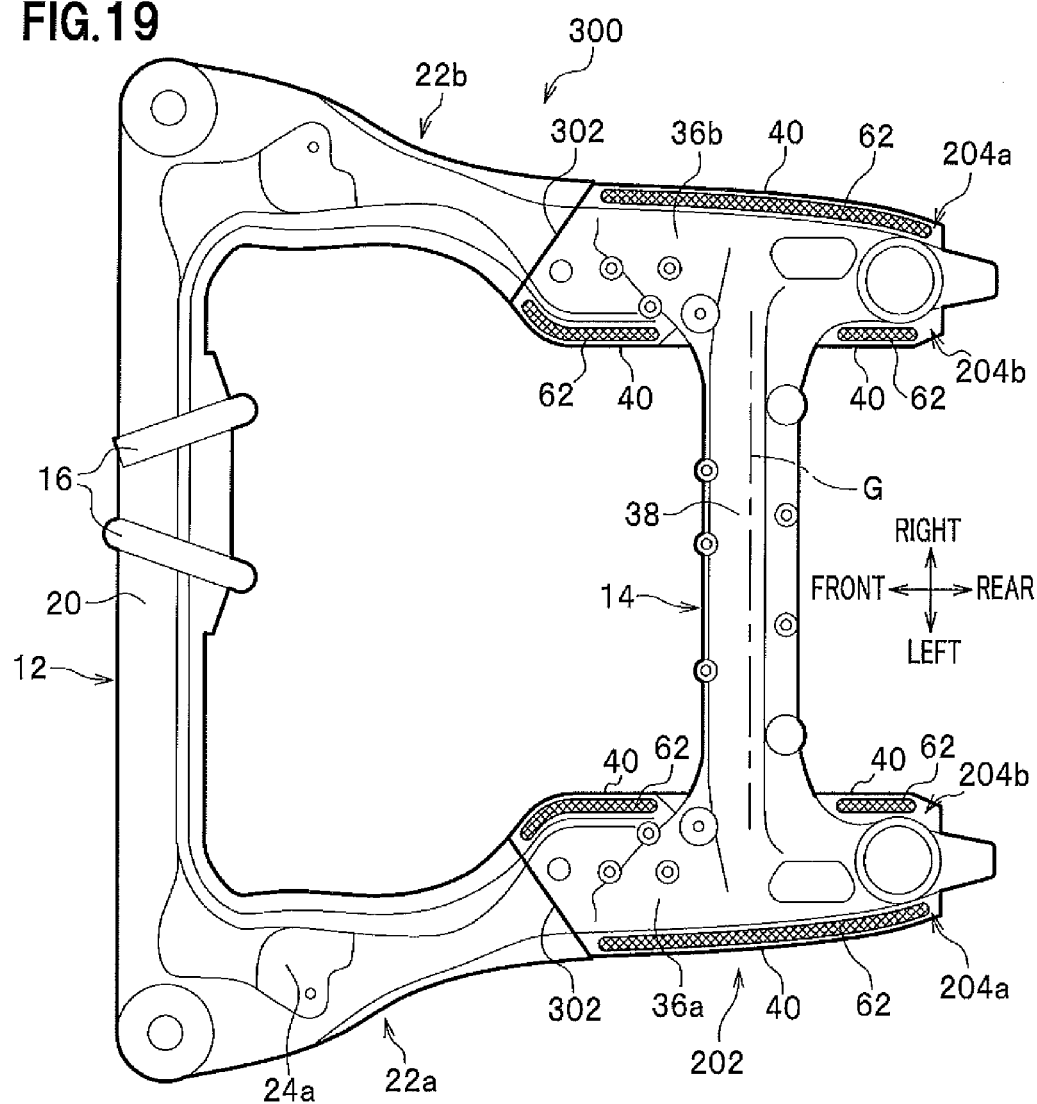
FIG. 19 is a plan view of a subframe structure according to a fourth embodiment.

FIG. 19 is a plan view of a subframe structure according to a fourth embodiment.

A subframe structure 300 according to the fourth embodiment is characterized in that front ends 302 of the left and right rear side sections 36a and 36b made of an aluminum alloy material are inclined so as to cross an axial line G of the rear cross section 38. The inclination of the front ends 302 brings about the advantage that the lengths and cross-sectional areas of the friction stir welding portions 62 can be arbitrarily increased and decreased for adjustment. Note that as the shapes of the front ends 302, the inside of the respective rear side sections 36a and 36b may be longer than the outside thereof toward the front direction or the outside may be longer than the inside toward the front direction.

Next, a joining method in each of the embodiments will be described in detail below.

Figure 20:
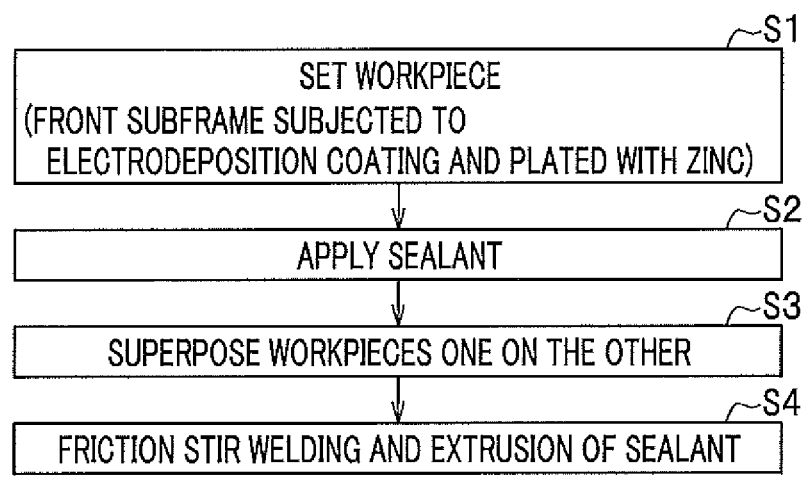
FIG. 20 is a diagram showing the flow of the process of joining together the front subframe and the rear subframe configuring the subframe structure by the friction stir welding in the first embodiment.

FIG. 20 is a diagram showing the flow of the process of joining together the front subframe 12 and the rear subframe 14 configuring the subframe structure 10 by the friction stir welding in the first embodiment.

First, a description will be given, with reference to FIG. 20, of the process of integrally joining together the superposed portions between the flange sections 28 on the side of the front subframe 12 made of a steel material and the flange sections 40 on the side of the rear subframe 14 made of a light metal material such as an aluminum alloy by the friction stir welding.

Figure 21A:
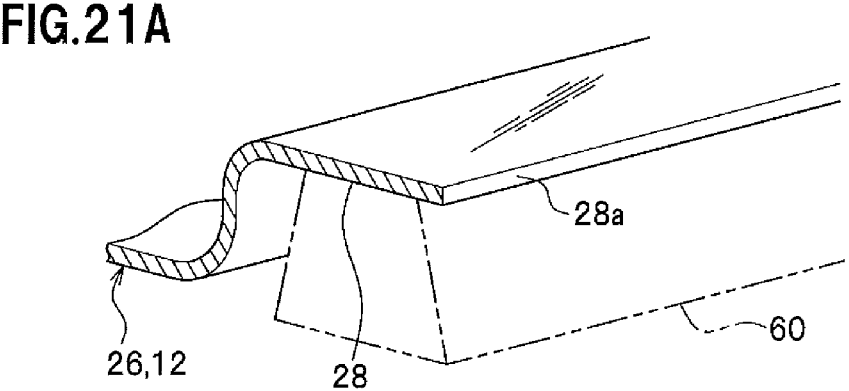
Figure 21B:
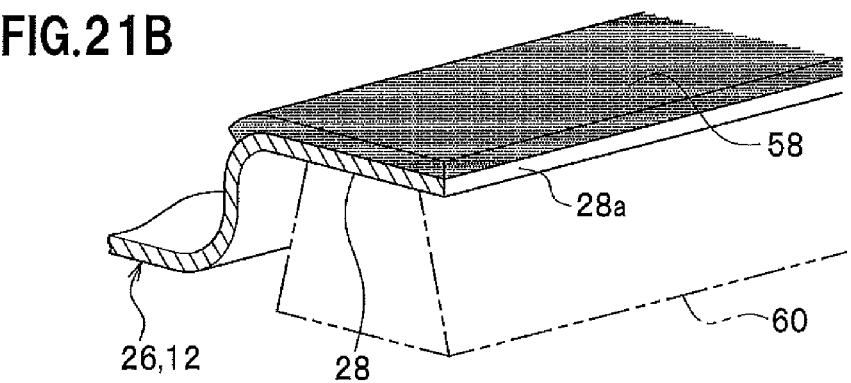
Figure 21C:
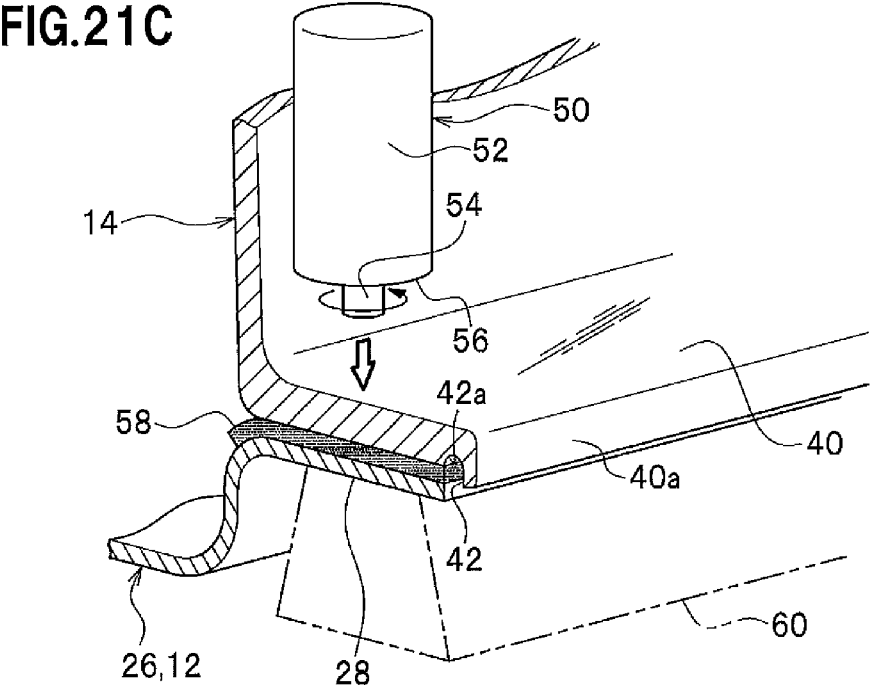
Figure 22A:
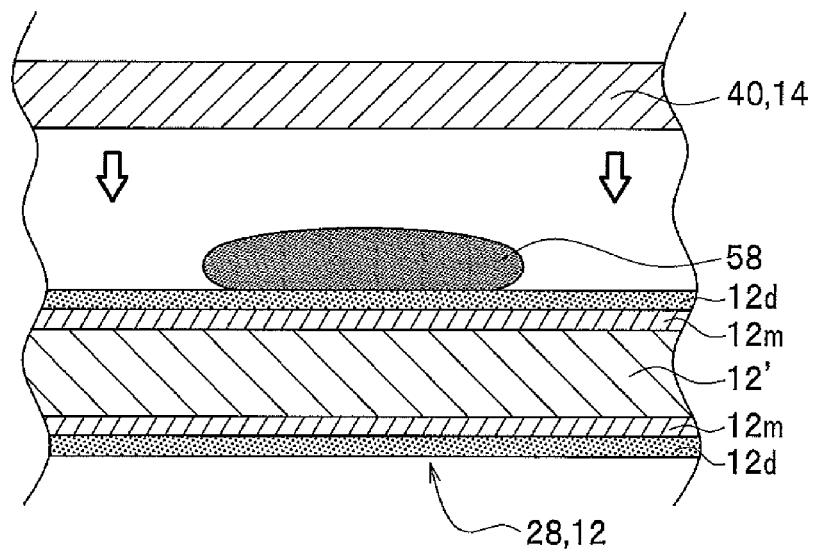
FIGS. 22A to 22C are cross-sectional views schematically showing the details of a joining interface when the front subframe and the rear subframe are joined together by the friction stir welding.
Figure 22B:
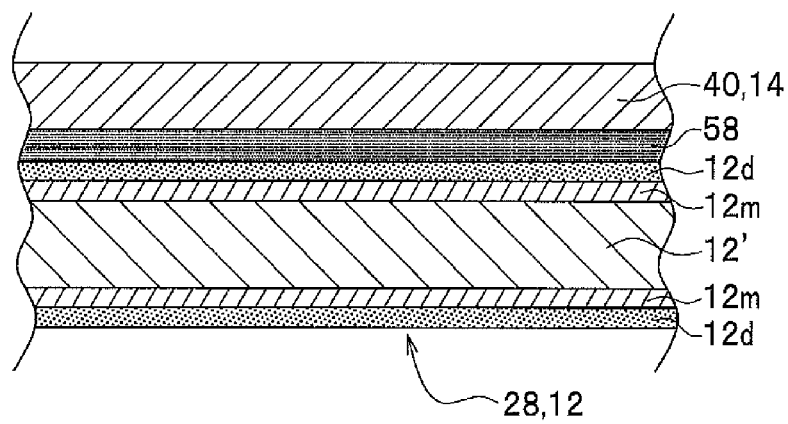
Figure 22C:
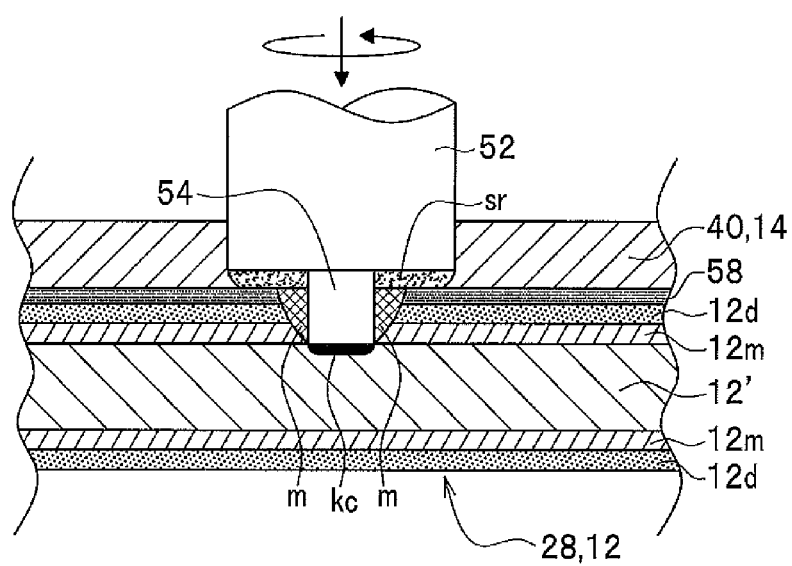

FIGS. 21A-21C are views showing the process of joining the front subframe 12 and the rear subframe 14 together by the friction stir welding. FIG. 21A is a view showing the process of setting the workpiece (S1 in FIG. 20). FIG. 21B is a view showing the process of applying the sealant (S2 in FIG. 20). FIG. 21C is a view showing the process of superposing the workpieces one on the other (S3 in FIG. 20). FIGS. 22A to 22C are cross-sectional views schematically showing the details of the joining interfaces when the front subframe 12 and the rear subframe 14 are joined together by the friction stir welding.

First, a press-formed body 12' formed into the front subframe 12 using a steel material (see FIG. 22A) is subjected to zinc alloy plating 12m and then to cation electrodeposition coating 12d. As shown in FIG. 22A, the front subframe 12 of the workpiece having been subjected to the zinc alloy plating 12m and the cation electrodeposition coating 12d is set on the jigs 60 such as clamp boards (S1 in FIG. 20).

Next, as shown in FIG. 21B, the sealants 58, e.g., the air-dry sealants are applied onto the upper surfaces of the flange sections 28 of the front subframe 12 by the sealant application mechanism not shown (see FIG. 22A) (S2 in FIG. 20).

Then, as shown in FIG. 21C, the flange sections 40 of the die-cast rear subframe 14 of the workpiece made of light metal such as an aluminum alloy material is superposed on the flange sections 28 having the sealants 58 applied onto the upper surfaces of the front subframe 12, and the flange sections 28 and 40 are clamped by the clamp mechanism not shown (S3 in FIG. 20). At this time, as shown in FIG. 22B, the sealants 58 spread between the flange sections 28 of the front subframe 12 and the flange sections 40 of the rear subframe 14.

Next, the process of joining the front subframe 12 and the rear subframe 14 together (the process of performing the friction stir welding and extruding the sealants 58) in step S4 of FIG. 20 is performed as follows.

The flange sections 28 of the front subframe 12 and the flange sections 40 of the rear subframe 14 are joined together by the friction stir welding using the joining tool 50. Note that as described above, the jigs 60 for receiving welding force to be applied to the respective flange sections 28 and 40 by the joining tool 50 are provided beneath the respective flange sections 28 and 40 of the front subframe 12 and the rear subframe 14.

As shown in FIG. 21C, the rotor 52 and the joining pin 54 are caused to gradually come close to the upper surfaces of the flange sections 40 of the rear subframe 14 made of a light metal material such as an aluminum alloy while being integrally rotated by the rotating and driving source not shown, and the tip end of the joining pin 54 is brought into contact with the upper surfaces of the flange sections 40 of the rear subframe 14 by welding force (pressing force) so as be rotated to penetrate. Thus, plastic flow areas are generated in the flange sections 40 of the rear subframe 14 (see FIG. 22C). By the plastic flow, intermetallic compounds kc as the compounds of light metal (e.g., aluminum) and iron are formed.

Figure 23:
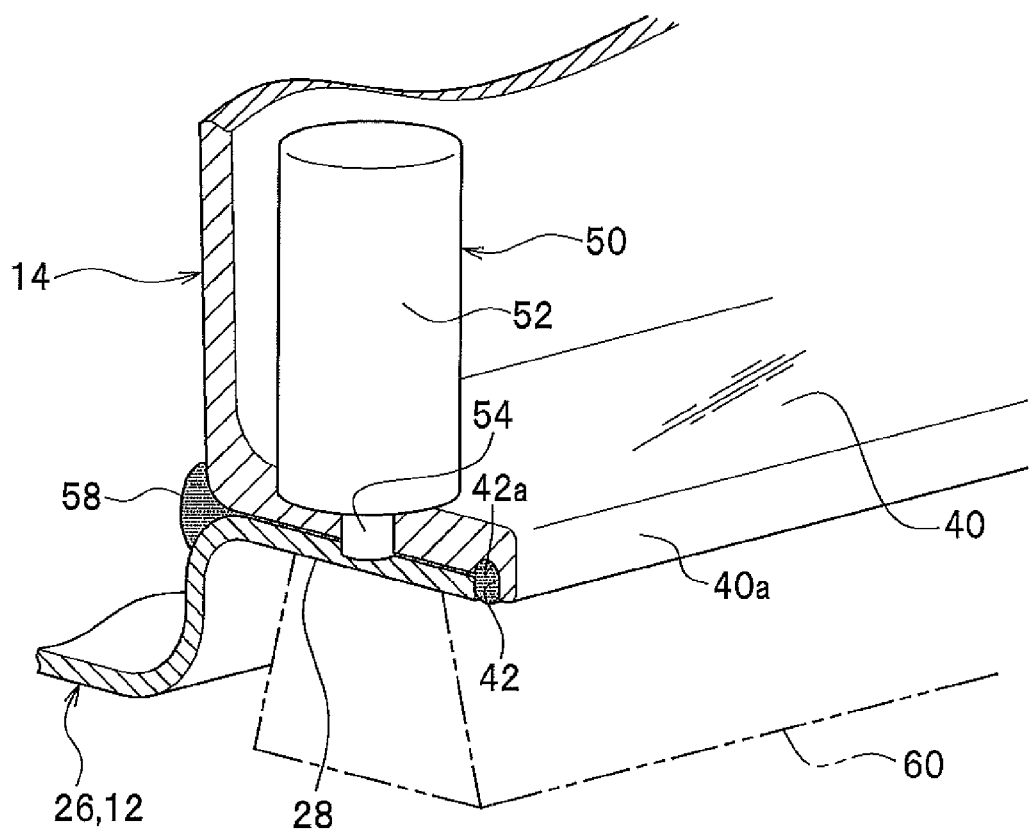
FIG. 23 is a perspective view showing a state in which the friction stir welding is performed using the joining tool.

FIG. 23 is a perspective view showing a state in which the friction stir welding is performed using the joining tool.

Moreover, the rotor 52 and the joining pin 54 are pressed to penetrate the flange sections 40 of the rear subframe 14 while being integrally rotated, and the joining pin 54 is inserted toward the vertically downward direction until the shoulder section 56 of the rotor 52 slides on the upper surfaces of the flange sections 40 of the rear subframe 14 as shown in FIG. 23.

On this occasion, as shown in FIG. 22C, the welding force is applied until, after penetrating the flange sections 40 of the rear subframe 14, the tip end of the joining pin 54 breaks through the layers of the applied sealants 58, the layers subjected to the cation electrodeposition coating 12d, and the layers subjected to the zinc alloy plating 12m formed on the upper surfaces of the flange sections 28 of the front subframe 12; extrudes the layers of the sealants 58, the layers subjected to the cation electrodeposition coating 12d, and the layers subjected to the zinc alloy plating 12m to the peripheries of the joining surfaces between the flange sections 40 and 28; and is brought into direct contact with the upper surfaces of the flange sections 28 of the front subframe 12.

When the joining pin 54 is rotated to penetrate until it is brought into contact with the upper surfaces of the front subframe 12 as described above, the plastic flow areas sr generated in the flange sections 40 of the rear subframe 14 made of a light metal material are plastically flowed and the new surfaces of the steel plates of the front subframe 12 made of a steel material are exposed to form the intermetallic compounds kc after the layers of the sealants 58, the layers subjected to the cation electrodeposition coating 12d, and the layers subjected to the zinc alloy plating 12m are extruded. Thus, the front subframe 12 is solid-phase welded to the rear subframe 14.

That is, since the rear subframe 14 made of a light metal material and the flange sections 28 of the front subframe 12 are firmly fixed together in such a manner that the antioxidants of the zinc alloy plating 12m, the coating films of the cation electrodeposition coating 12d, and the sealants 58 are extruded to the peripheries of the joining surfaces and mixed together to form walls, the separation of coatings or the like is prevented. In addition, the sealants 58, the layers subjected to the cation electrodeposition coating 12d, and the layers subjected to the zinc alloy plating 12m do not exist at the joining surfaces between the flange sections 40 and the flange sections 28. Note that as described above, mixtures m of the layers subjected to the zinc alloy plating 12m, the layers subjected to the cation electrodeposition coating 12d, and the sealants 58 are formed like walls around the joining pin 54.

As described above, when the rotor 52 and the joining pin 54 are rotated to penetrate the flange sections 40 of the rear subframe 14 and displaced along the extending direction of the superposed flange sections 28 and 40 in a state in which the tip end of the joining pin 54 is brought into contact with the upper surfaces of the flange sections 28 of the front subframe 12, the friction stir welding portions 62 (see the netted sections in FIG. 3A) are formed.

Note that at the friction stir welding portions 62, the intermetallic compounds kc are generated at the joining interfaces between the rear subframe 14 (light metal material such as an aluminum alloy) on the top side and the front subframe 12 (steel material) on the bottom side as shown in FIG. 22C. The intermetallic compounds kc are generated so as to be dispersed in the joining interfaces in a granular form or a divided layered form rather than a continuous layered form extending over the entire joining interfaces.

Figure 24:
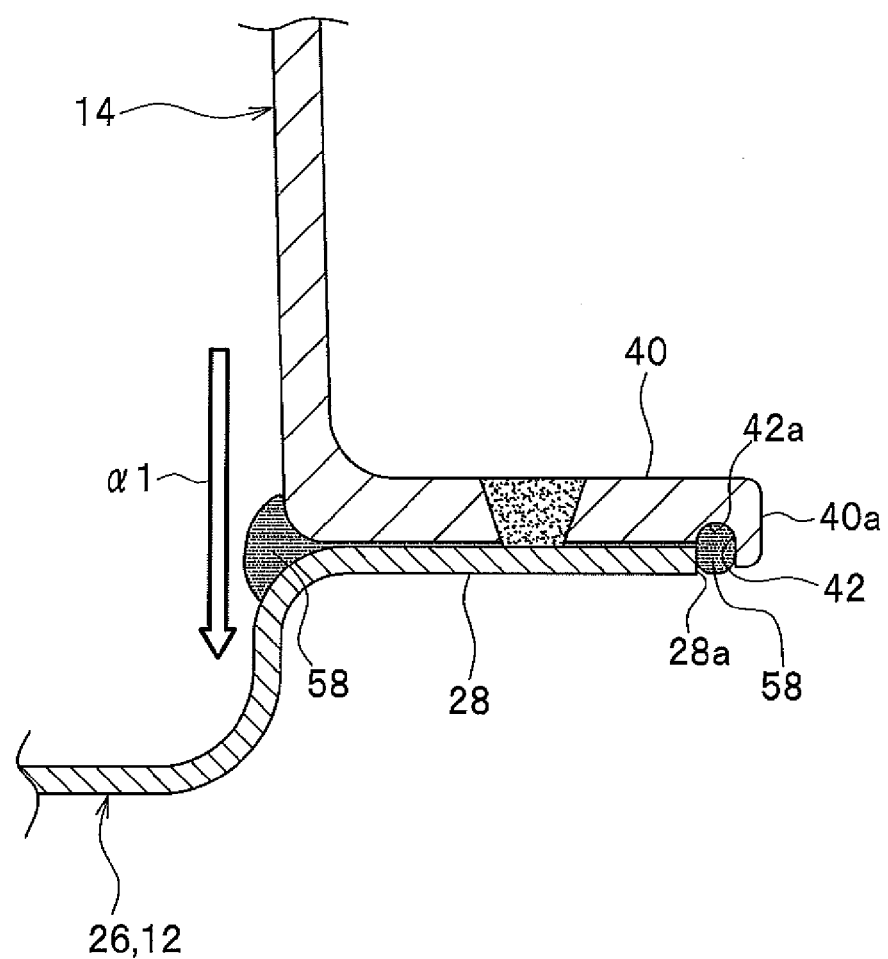
FIG. 24 is a horizontal cross-sectional view showing the joining section between the flange section of the front subframe and the flange section of the rear subframe.

FIG. 24 is a horizontal cross-sectional view showing the joining section between the flange section 28 of the front subframe 12 and the flange section 40 of the rear subframe 14.

If the sealants 58 held in the concave sections 42 include, e.g., air-dry sealants, they solidify after the lapse of a prescribed period of time to reliably seal the gaps between the flange sections 28 and 42 on the left and right sides of the front subframe 12 and the rear subframe 14.

As a result, in the embodiment, the scattering of the sealants 58 protruded from both left and right sides of the front subframe 12 and the rear subframe 14 joined together by the friction stir welding is prevented since the sealants 58 remain in the concave sections 42. Thus, the reliability of the filling of the sealants 58 can be achieved.

In addition, the intrusion of corrosion factors such as water from the gaps on both left and right sides of the front subframe 12 and the rear subframe 14 is reduced. Thus, high antirust performance can be ensured.

Moreover, the operator can visually confirm the remaining degree (remaining amount) of the sealants 58 in the concave sections 42 from the outside. Therefore, by confirming the application amount of the sealants 58, the operator can determine whether the sealants 58 have been reliably interposed between the front subframe 12 and the rear subframe 14.

Further, although closed space having the closed cross sections 44 is formed between the front subframe 12 and the rear subframe 14 when the flange sections 28 and 40 are joined together by the friction stir welding, the sealants 58 are also protruded toward the areas inside the flange sections 28 and 40 where the closed space having the closed cross sections is formed and solidified to exhibit the sealing function. Thus, the water remaining prevention structure can be obtained in which water droplets flow on the protruded sealants 58 between the respective flange sections 28 and 40 and do not remain in the gaps between the flange sections 28 and 40 even if the water droplets (water) fall down along the inner wall surfaces of the rear subframe 14 on the top side as indicated by the arrow α1 in FIG. 24.

Furthermore, when the different types of the materials of the front subframe 12 made of a steel member and the rear subframe 14 made of a light metal member such as aluminum are joined together by the friction stir welding, there is a concern that a potential difference occurs between the respective metal materials due to a difference in the ionization of the respective metal materials and corrosion is caused by the contact between the different types of the metal materials when corrosion current flows. However, in the embodiment, the flow of corrosion current can be prevented by the solidification of the sealants 58 protruded from the flange sections 28 and 40 joined together by the friction stir welding. As a result, resistance to corrosion caused by the contact between the different types of the metal materials can be enhanced.

In addition, since the front subframe 12 can have a coating applied thereon in its single state, the coating is facilitated and the labor of the coating is greatly saved. Further, the omission of the coating of the front subframe 12 is prevented.

Next, a joining method in the third embodiment will be described in detail below.

Figure 25A:
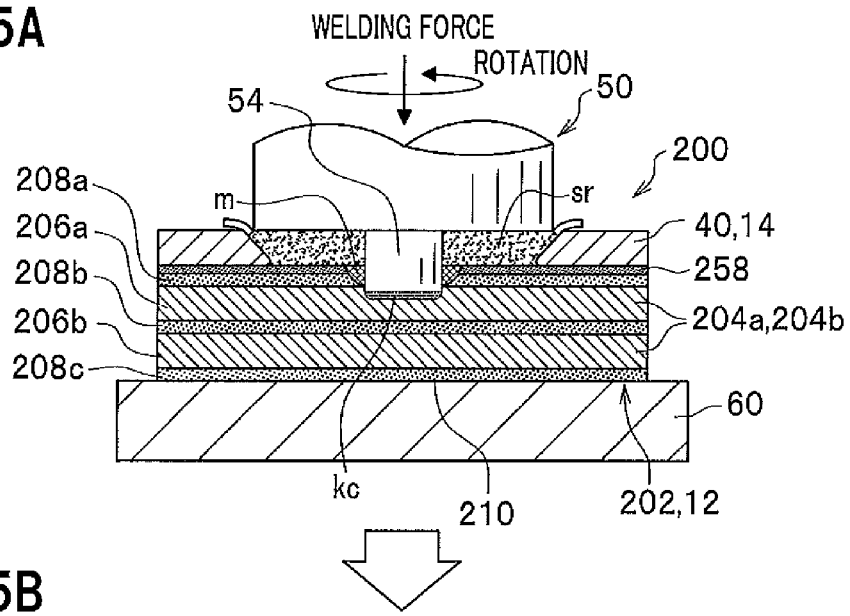
FIG. 25A is a cross-sectional view showing a specific example of a state in which the respective flange sections of the front subframe and the rear subframe are joined together by the friction stir welding in the subframe structure according to the third embodiment.

As shown in FIG. 25A, the flange sections 204a and 204b of the left and right side members 22a and 22b having the two thin plates 206a and 206b laminated thereon and the flange sections 40 and 40 of the left and right side sections 36a and 36b of the rear subframe 14 are joined together by the friction stir welding using the joining tool 50. At this time, the joining pin 54 of the joining tool 50 is, when brought into contact with the flange sections 204a and 204b, rotated to penetrate the flange sections 40 and 40 of the left and right side sections 36a and 36b to generate the plastic flow areas sr and extrudes the electrodeposition coating films 208a and the sealants 258 of the left and right side members 22a and 22b to the peripheries of the joining surfaces between the flange sections 204a and 204b and the flange sections 40 and 40 to form the walls of the mixtures m of the electrodeposition coating films 208a and the sealants 258.

On this occasion, the electrodeposition coating films 208a and the sealants 258 are extruded to the peripheries of the joining surfaces to form the walls of the mixtures m, and the flange sections 40 and 40 of the left and right side sections 36a and 36b and the flange sections 204a and 204b of the left and right side members 22a and 22b are firmly fixed together when the intermetallic compounds kc as the compounds of light metal (e.g., aluminum) and iron are formed by plastic flow. Therefore, the separation of the electrodeposition coating films 208 is prevented. In addition, the electrodeposition coating films 208a and the sealants 258 do not exist at the respective joining surfaces between the flange sections 40 and 40 and the thin plates 206a and 206b.

Moreover, although friction heat is applied to the flange sections 40 and 40 of the left and right side sections 36a and 36b, the transmissibility of the heat to the rear surfaces 210 of the friction stir welding portions (the rear surfaces of the flange sections 204a and 204b) is reduced by the lamination of the two thin plates 206a and 206b made of steel. Therefore, the temperature of the electrodeposition coating films 208c formed on the rear surfaces of the flange sections 204a and 204b does not reach prescribed temperature (threshold temperature) at which the decomposition of the electrodeposition films 208c is allowed (see FIG. 25B). As a result, the separation of the electrodeposition films 208c from the rear surfaces of the flange sections 204a and 204b can be prevented (see FIG. 25C).

In other words, friction heat is generated when the joining pin 54 is rotated to penetrate toward the joining objects at the friction stir welding, and the electrodeposition coating films formed on the lower surfaces of the laminated thin plates made of steel may be separated.

Figure 25B:
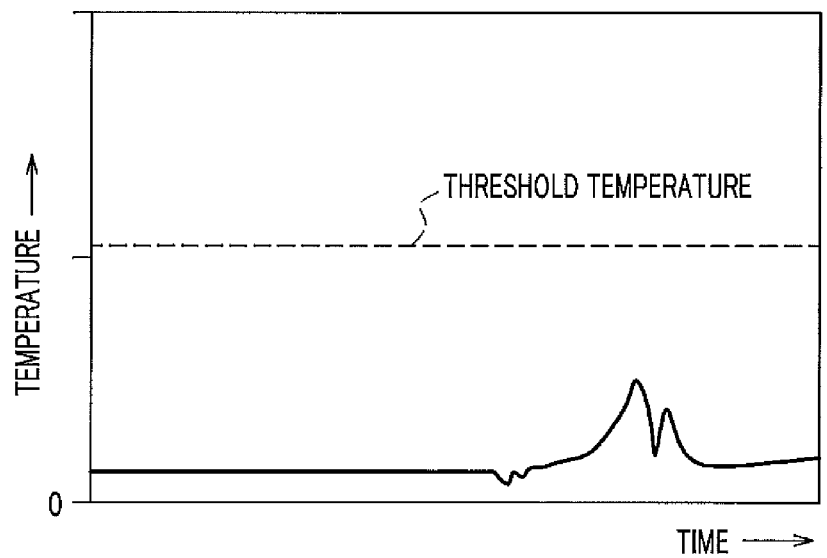
FIG. 25B is a characteristic diagram in which the temperature of the rear surfaces of friction stir welding portions is measured.
Figure 25C:
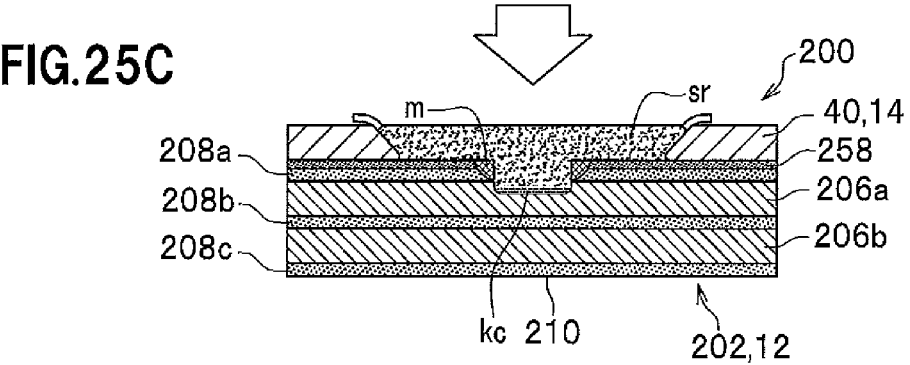
FIG. 25C is a cross-sectional view showing a state after the friction stir welding.

In view of this, in the third embodiment, the sections ranging from the central sections 24b to the extending sections 202 behind the central sections 24b of the left and right side members 22a and 22b configuring the front subframe 12 are formed to have air space therein in such a manner that the two thin plates 206a and 206b made of a steel material are made thin and laminated together as shown in FIGS. 25A-25C to reduce the transmissibility of the heat.

Thus, the transfer of the friction heat generated when the joining pin 54 is rotated to penetrate to the electrodeposition coating films 208 formed on the lower surfaces of the thin plates 206b on the lower layer side is reduced, whereby the electrodeposition coating films 208c formed on the rear surfaces 210 of the friction stir welding portions (the rear surfaces of the flange sections 204a and 204b) are protected.

Note that the third embodiment exemplifies a case in which the electrodeposition coating films 208a to 208c are formed in advance by the electrodeposition coating processing on both the front and rear surfaces and the joining surfaces (laminating surfaces) between both the front and rear surfaces of the flange sections 204a and 204b of the respective left and right side members 22a and 22b. However, the electrodeposition coating films 208a to 208c may be formed by the electrodeposition coating processing after both the front and rear surfaces and the joining surfaces (laminating surfaces) between both the front and rear surfaces of the flange sections 204a and 204b are each plated with a zinc alloy or the like.

In this case, the electrodeposition coating films 208a, the plated zinc alloys or the like, and the sealants 258 are mixed together and extruded to the peripheries of the respective joining surfaces between the flange sections 40 and 40 of the left and right side sections 36a and 36b and the flange sections 204a and 204b of the left and right side members 22a and 22b, whereby the walls of the mixtures m of the electrodeposition coating film 208a, the plated zinc alloys or the like, and the sealants 258 are formed. With the formation of the walls, the flange sections 40 and 40 of the left and right side sections 36a and 36b and the flange sections 204a and 204b of the left and right side members 22a and 22b are firmly fixed together (solid-phase joined) when the intermetallic compounds as the compounds of light steel and iron are formed by plastic flow. Therefore, the separation of the electrodeposition coating films 208a and the plated zinc alloys or the like is prevented. In addition, the electrodeposition coating films 208a, the plated zinc alloys or the like, and the sealants 258 do not exist at the respective joining surfaces between the flange sections 40 and 40 and the thin plates 206a and 206b. Note that in the third embodiment, the sealants 258 may not be used. However, it is more desirable to use the sealants 258 since they have antirust performance.

Figure 26:
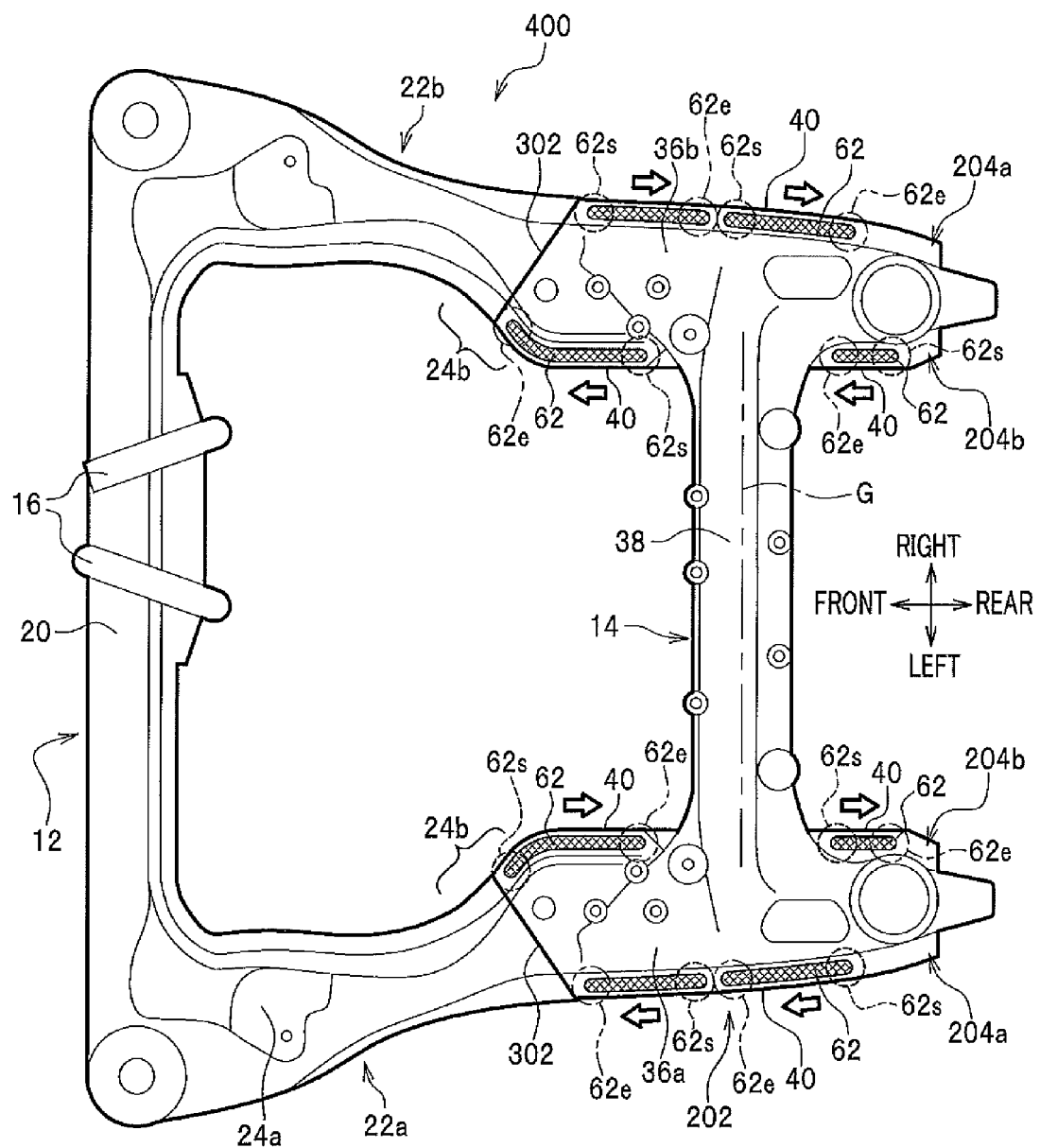
FIG. 26 is a plan view of a subframe structure according to a fifth embodiment.

FIG. 26 is a plan view of a subframe structure according to a fifth embodiment. Note that in FIG. 26, reference symbols 62s (start sections) represent locations at which the friction stir welding is started and reference symbols 62e (end sections) represent locations at which the friction stir welding is ended. In addition, open arrows between the reference symbols 62s and 62e represent the progress of the operation of the friction stir welding.

Figure 27A:
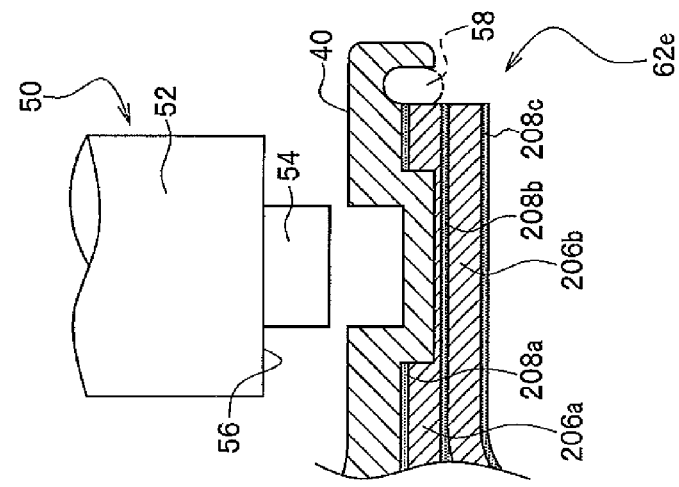
Figure 27B:
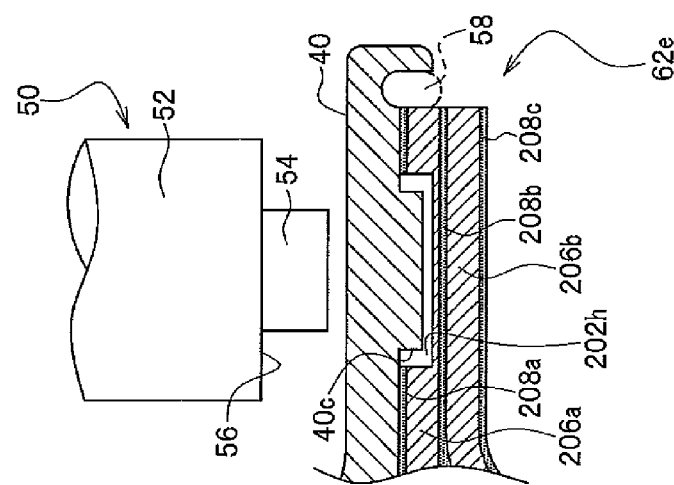
Figure 27C:
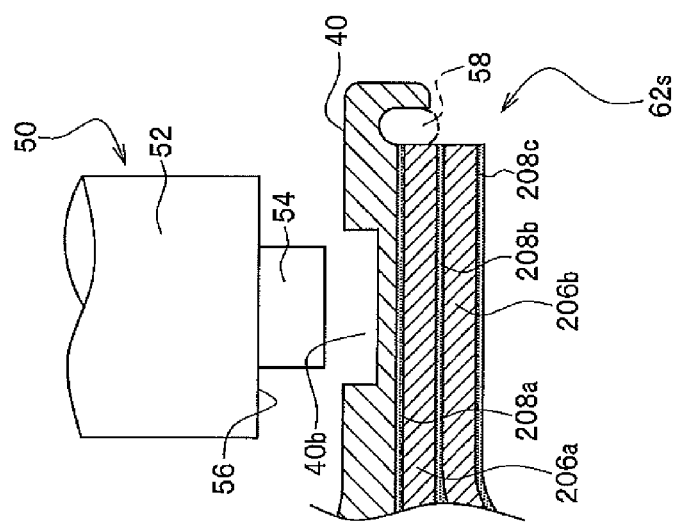

FIGS. 27A-27C is a view showing the process of the friction stir welding applied to the subframe structure according to the fifth embodiment. FIG. 27A is a cross-sectional view showing the state of the start section of a location at which the friction stir welding is started. FIG. 27B is a cross-sectional view showing a state before the friction stir welding at the end section of a location at which the friction stir welding is ended. FIG. 27C is a cross-sectional view showing a state after friction stir welding at the end section of a location at which the friction stir welding is ended.

A subframe structure 400 according to the fifth embodiment is different from the subframe structure 200 according to the third embodiment in that the shapes of the start sections 62s at which the friction stir welding is started and those of the end sections 62e are changed to perform the friction stir welding shown in FIGS. 25A-25C.

As shown in FIG. 27A, concave-shaped concave sections 40b, which receive the tip end of the joining pin 54 protruding downward from the bottom center of the rotor 52 and are greater or substantially equal to the tip end of the joining pin 54, are formed in the flange sections 40 and 40 of the left and right side sections 36a and 36b made of light metal such as aluminum at the start sections 62s.

With this configuration, the generation of chips (burrs) from the flange sections 40 is reduced and the insertion of the joining pin 54 is enhanced when the joining pin 54 is rotated to penetrate to start the friction stir welding. Accordingly, the process of the friction stir welding can be smoothly started, and the finished quality of the start sections 62s at which the friction stir welding is started can be made satisfactorily.

Further, the joining pin 54 is rotated from the start sections 62s to extrude the electrodeposition coating films 208a to the peripheries of the joining surfaces between the flange sections 40 and the thin plates 206a to form the walls, is rotated in direct contact with the thin plates 206a to continue the friction stir welding of the flange sections 40 and the thin plates 206a and 206b, and reaches the end sections 62e at which the friction stir welding is ended as shown in FIG. 27C. At this time, since the flange sections 40 of the left and right side sections 36a and 36b and the thin plates 206a and 206b are firmly fixed together in such a manner that the electrodeposition coating films 208a are extruded to the peripheries of the joining surfaces between the flange sections 40 and the thin plates 206a to form the walls, the separation of the electrodeposition coating films 208a is prevented. In addition, the electrodeposition coating films 208a do not exist at the joining surfaces between the flange sections 40 and the thin plates 206a.

Next, a description will be given of the configuration of the end sections 62e serving as points at which the friction stir welding of the flange sections 40 and the thin plates 206a and 206b as shown in FIG. 27B and FIG. 27C is ended.

At the upper parts of the end sections 62, at which the friction stir welding is ended, of the thin plates 206a and 206b ranging from the central sections 24b of the left and right side members 22a and 22b to the extending sections 202 behind the central sections 24b of the front subframe 12 shown in FIG. 26, concave-shaped concave sections 202h greater than the tip end of the joining pin 54 are formed in advance as shown in FIG. 27B. At the same time, convex-shaped convex sections 40c fitted in the concave sections 202h of the thin plates 206a and 206b are formed in advance in the flange sections 40 and 40 of the left and right side sections 36a and 36b made of light metal such as aluminum, the flange sections 40 and 40 being superposed on the thin plates 206a and 206b at the end sections 62e from above.

Prior to the friction stir welding, as shown in FIG. 27B, the flange sections 40 and 40 of the left and right side sections 36a and 36b made of light metal such as aluminum are superposed on the thin plates 206a and 206b of the left and right side members 22a and 22b of the front subframe 12 so that the convex sections 40c and 40c of the flange sections 40 and 40 are fitted in the concave sections 202h of the thin plates 206a.

Then, when the joining pin 54 protruding downward from the bottom center of the rotor 52 is rotated to penetrate the flange sections 40 on the upper side, the flange sections 40 and 40 of the left and right side sections 36a and 36b of the rear subframe 14 and the thin plates 206a and 206b of the left and right side members 22a and 22b of the front subframe 12 are joined together by the friction stir welding as shown in FIG. 27C.

As shown in FIG. 27B, the concave sections 202h greater than the joining pin 54 are formed at the upper parts of the end sections 62e, at which the friction stir welding is ended, in the thin plates 206a and 206b of the left and right side members 22a and 22b of the front subframe 12. In addition, the convex sections 40c fitted in the concave sections 202h of the thin plates 206a and 206b are formed in the flange sections 40 and 40 of the left and right side sections 36a and 36b made of light metal such as aluminum, the flange sections 40 and 40 being superposed on the thin plates 206a and 206b at the end sections 62e from above. Thus, the exposure of the thin plates 206 at the end sections 62e is prevented after the friction stir welding.

In addition, since the light metal such as aluminum of the flange sections 40 is filled in the concave sections 202h of the thin plates 206a and 206b, the occurrence of corrosion is reduced at the end sections 62e of the thin plates 206a and 206b.

Note that as in the third embodiment, the electrodeposition coating films may be formed on the thin plates 206a, 206b, and 206c after both surfaces of the respective thin plates 206a and 206 are plated with a zinc alloy or the like.

In this case, the joining pin 54 is rotated to mix together the electrodeposition coating films 208a and the plated zinc alloys or the like (antioxidants) and protrude the mixtures to the peripheries of the joining surfaces between the joining pin 54 and the thin plates 206a to form walls, and is rotated in contact with the thin plates 206a to join the flange section 40 and the thin plates 206a and 206b together by the friction stir welding. On this occasion, while the electrodeposition coating films 208a and the plated zinc alloys or the like are extruded to the peripheries of the joining surfaces to form the walls, intermetallic compounds are formed to firmly fix together the flange sections 40 of the left and right side sections 36a and 36b and the thin plates 206a. Therefore, the separation of the electrodeposition coating films 208a and the plated zinc alloys or the like is prevented. In addition, the electrodeposition coating films 208a and the plated zinc alloys or the like do not exist at the joining surfaces between the flange sections 40 and the thin plates 206a.

Note that as shown in FIG. 27C, it is desirable to apply the sealants 58 (as indicated by two-dot chain line) onto the thin plates 206a before superposing the flange sections 40 on the thin plates 206a. In this case, while the sealants 58, the electrodeposition coating films 208a, and the plated zinc alloys or the like are extruded to the peripheries of the joining surfaces to form the walls, the joining pin 54 is rotated in contact with the thin plates 206a to firmly fix together the flange sections 40 of the left and right side sections 36a and 36b and the thin plates 206a. Therefore, the sealants 58, the electrodeposition coating films 208a, and the plated zinc alloys or the like do not exist at the joining surfaces between the flange sections 40 and the thin plates 206a.

In addition, the configurations of the start sections 62s and the end sections 62e in the process of the friction stir welding according to the fifth embodiment may be applied to the first to fourth embodiments.

According to the configurations of the first to fifth embodiments, the friction stir welding is performed in a state in which the cation (ED) electrodeposition coating or the like is applied. Therefore, desired joining strength can be ensured.

In joining the light metal member such as an aluminum member and the iron member together by the friction stir welding, the friction stir welding is performed after the iron member is subjected to the electrodeposition coating in advance. Thus, the coating films are not melted as in melt welding, which saves the labor of applying coatings and allows the application of coatings to be preceded in every detail. In addition, the light metal member and the iron member can be joined together by the extrusion of the coating films to the outside.

Note that the above embodiments describe the cation electrodeposition coating as electrodeposition coating, but electrodeposition coating other than the cation electrodeposition coating may be applied.

Note that the above embodiments describe the aluminum alloy (aluminum) as an example in which the rear subframe 14 is made of light metal, but it is needless to say that light metal other than the aluminum alloy (aluminum) may be used.

In addition, the first to fifth embodiments describe the various configurations, but the respective configurations may be arbitrarily combined together as occasion demands.

Note that the embodiments exemplify the zinc alloy plating, but pure zinc plating may be used. However, the zinc alloy plating is more desirable since it is more excellent in moldability and anticorrosion. Note that "zinc plating," which will be described later, includes both the zinc alloy plating and the pure zinc plating.

With the joining method described above, the following advantages or effects are obtained.

The method of superposing a steel member and a light metal member one on the other and joining them together by the friction stir welding in their non-melting state may include a coating process in which the steel member is coated and a joining process in which a rotation tool is rotated to penetrate the joining section between the light metal member and the steel member and the joining section of the light metal member is softened and plastically flowed by friction heat generated at this time to join the steel member and the light metal member together.

According to this joining method, the application of a coating can be preceded in every detail since a coating film is not melted as in melt welding. In addition, the application of a coating can be preceded since the coating film can be extruded outward. Moreover, an intermetallic compound is formed by plastic flow.

In addition, the coating film may not exist on the joining surface in such a manner that the application of a coating is performed based on electrodeposition coating and the coating film by the application of a coating is extruded to the periphery of the joining surface between the light metal member and the steel member. According to the joining method, the light metal member and the steel member can be joined together by the extrusion of the coating film to the outside of the joining surface.

Further, the steel member may be plated with zinc, and a layer plated with the zinc may be extruded to the periphery of the joining surface together with the coating film of the electrodeposition coating. According to this joining method, the light metal member and the steel member can be joined together by the extrusion of the layer plated with the zinc.

Furthermore, a sealant may be provided between the steel member and the light metal member and extruded to the periphery of the joining surface together with the layer plated with the zinc and the coating film of the electrodeposition coating. According to this joining method, the sealant is mixed with the coating film and the antioxidant of the plated zinc of the steel member, whereby an antirust effect can be exhibited. In addition, the steel member and the light metal member can be joined together by the extrusion of the mixture of the sealant and other substances to the outside of a joining interface.

Furthermore, the tip end of the rotation tool may be pushed until it is brought into contact with the steel member. According to this joining method, the light metal member can be reliably stirred, and the layer plated with the zinc, the coating film, and the like can be extruded if the steel member is coated with the layer plated with the zinc, the coating film, and the like.

Furthermore, the steel member at the joining section may include a plurality of steel members superposed one on another. According to this joining method, an increase in the temperature of the lower surface of the steel member can be reduced in the process of joining the steel member and the light metal member together.

Furthermore, a first concave-shaped concave section greater than or substantially equal to the tip end of the rotation tool may be formed in the section of the light metal member in which the tip end of the rotation tool is caused to penetrate at a start section at which the joining process is started. According to this joining method, the insertion of the tip end of the rotation tool into the steel member is enhanced, whereby the generation of chips can be reduced.

Furthermore, a second concave-shaped concave section greater than the tip end of the rotation tool may be formed in a section of the steel member in which the tip end of the rotation tool is caused to penetrate at an end section at which the joining process is ended, and a convex-shaped convex section received in the second concave section of the steel member may be formed in the light metal member. According to this joining method, the exposure of the steel member can be prevented at the end section at which the joining process is ended, and the occurrence of corrosion can be reduced since the steel member at the end section can be coated with the light metal member.

EXPLANATION OF REFERENCES 10, 100, 200, 300, 400: subframe structure
11: vehicle
12: front subframe (member made of steel, steel member)
14: rear subframe (aluminum member, light metal member)
20: front cross member
22a, 22b: left side member, right side member
26: thin plate section (extending section)
28: flange section (steel member)
30: bolt
32: bolt insertion hole
36a, 36b: left rear side section, right rear side section
38: rear cross section
40: flange section (light metal member)
40b: concave section (first concave section)
40c: convex section
44: closed cross section
54: joining pin (rotation tool for friction stir welding, rotation tool)
58, 258: sealant (sealing member)
62s: start section
62e: end section
102a, 102b: thin plate
202h: concave section (second concave section)
204a, 204b: flange section
206a, 206b: steel thin plate (a plurality of superposed steel members)
208a to 208c: electrodeposition coating film
210: rear surface
S1: setting of workpiece (coating process)
S4: friction stir welding and extrusion of the sealant (joining process)

The invention claimed is:

1. A joining method for forming a joint structure of different materials, comprising the steps of:
providing a steel member comprising a flange section including an outer edge portion having a lateral end surface, and a light metal member comprising a flange section having a peripheral groove formed in an underside thereof, the flange section of the light metal member including a ceiling surface disposed and recessed vertically upwardly on the underside thereof and a lateral edge section extending vertically downwardly from an outer edge of the ceiling surface, the peripheral groove being defined by the ceiling surface and the lateral edge section;
applying a coating to the steel member to make a coated steel member;
applying an electrically non-conductive sealant to the flange section of the coated steel member;
stacking the flange section of the light metal member on top of the flange section of the coated steel member, thereby sandwiching the sealant therebetween, the peripheral groove being disposed laterally outside the outer edge portion of the steel member, the peripheral groove being further defined by the lateral end surface of the steel member disposed vertically under an inner edge of the ceiling surface; and
joining the sealant-applied steel member and the light metal member together by rotatingly pushing a rotation tool into a joint portion of the light metal member with the sealant-applied steel member, generating friction heat, and having the joint portion of the light metal member softened and plastically flow under the friction heat, wherein the sealant is extruded outwardly beyond the outer edge portion of the steel member to substantially fill the groove formed by the ceiling surface and the lateral edge section of the light metal member and the outer edge portion of the steel member.

2. The joining method for forming a joint structure of different materials according to claim 1, wherein: the coating is applied by electrodeposition, and the method further comprises the step of removing the coating from a joint surface between the steel member and the light metal member at the joint portion by extruding the coating to a periphery of the joint surface.

3. The joining method for forming a joint structure of different materials according to claim 2, further comprising the steps of: applying a zinc plating to the steel member to form a zinc plated layer; and extruding the zinc plated layer together with the coating to the periphery of the joint surface.

4. The joining method for forming a joint structure of different materials according to claim 3, further comprising the steps of: extruding the sealant together with the zinc plated layer and the coating to the periphery of the joint surface.

5. The joining method for forming a joint structure of different materials according to claim 1, wherein the joining step involves pushing in the rotation tool until a tip end of the rotation tool comes in contact with the steel member.

6. The joining method for forming a joint structure of different materials according to claim 1, wherein the steel member at the joint portion comprises sheets stacked on each other.

7. The joining method for forming a joint structure of different materials according to claim 1, wherein the light metal member includes at a start section, and in the joining step a tip end of the rotation tool is pushed into the start section of the light metal member, and wherein the start section of the light metal member includes a first concave section which is approximately equal to or larger in size than the tip end of the rotation tool.

8. The joining method for forming a joint structure of different materials according to claim 1, wherein the steel member includes at an end section for ending the joining step a portion into which a tip end of the rotation tool is pushed, the portion of the steel member includes a second concave section which is larger in size than the tip end of the rotation tool, and the light metal member includes a convex section received in the second concave section of the steel member.

9. A joining method for forming a joint structure of different materials, said method comprising the steps of:
providing a steel member comprising a flange section including an outer edge portion having a lateral end surface, and a light metal member, the light metal member comprising a flange section extending outwardly thereon and having a concave groove formed in a lower surface of the flange section proximate an outermost edge thereof, the flange section of the light metal member including a ceiling surface disposed and recessed vertically upwardly on the underside thereof and a lateral edge section extending vertically downwardly from an outer edge of the ceiling surface, the concave groove being defined by the ceiling surface and the lateral edge section;
applying a coating to the steel member to make a coated steel member;
applying an electrically non-conductive sealant on top of the flange section of the coated steel member;
stacking the flange section of the light metal member on the flange section of the coated steel member in a manner such that the concave groove is disposed laterally outside the outer edge portion of the steel member, wherein the sealant is sandwiched between the light metal member and the coated steel member, and the concave groove is further defined by the lateral end surface of the steel member disposed vertically under an inner edge of the ceiling surface; and
joining the steel member and the light metal member together by rotatingly pushing a rotation tool into a joint portion of the light metal member with the steel member, generating friction heat, and having the joint portion of the light metal member softened and plastically flow under the friction heat, wherein the sealant is extruded outwardly beyond the outer edge portion of the steel member during the joining step to substantially fill the concave groove formed by the ceiling surface and the lateral edge section of the light metal member and the outer edge portion of the steel member.

* * * * *